United States Patent
Yoshimura et al.

(10) Patent No.: US 10,628,273 B2
(45) Date of Patent: Apr. 21, 2020

(54) NODE SYSTEM, SERVER APPARATUS, SCALING CONTROL METHOD, AND PROGRAM

(71) Applicant: NEC CORPORATION, Tokyo (JP)

(72) Inventors: Yuki Yoshimura, Tokyo (JP); Tadaaki Miyata, Tokyo (JP); Hajime Zembutsu, Tokyo (JP); Takuya Shoji, Tokyo (JP); Hironori Magatani, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 58 days.

(21) Appl. No.: 15/544,416

(22) PCT Filed: Jan. 29, 2016

(86) PCT No.: PCT/JP2016/052803
§ 371 (c)(1),
(2) Date: Jul. 18, 2017

(87) PCT Pub. No.: WO2016/121973
PCT Pub. Date: Aug. 4, 2016

(65) Prior Publication Data
US 2018/0018244 A1    Jan. 18, 2018

(30) Foreign Application Priority Data
Jan. 30, 2015  (JP) .................... 2015-017718

(51) Int. Cl.
*G06F 11/00*    (2006.01)
*G06F 11/20*    (2006.01)
(Continued)

(52) U.S. Cl.
CPC ...... *G06F 11/2023* (2013.01); *G06F 9/45558* (2013.01); *G06F 9/5061* (2013.01);
(Continued)

(58) Field of Classification Search
CPC .. G06F 11/2023; G06F 11/20; G06F 11/1658; G06F 11/2033; G06F 11/2097;
(Continued)

(56) References Cited

U.S. PATENT DOCUMENTS

| | | |
|---|---|---|
| 6,088,371 A | 7/2000 | Inada et al. |
| 8,706,852 B2 * | 4/2014 | Kunze .................. G06F 9/5061 370/252 |

(Continued)

FOREIGN PATENT DOCUMENTS

| | | |
|---|---|---|
| EP | 2487592 A1 | 8/2012 |
| JP | 5-268647 A | 10/1993 |

(Continued)

OTHER PUBLICATIONS

Communication dated Jul. 23, 2018 from the European Patent Office in counterpart application No. 16743576.7.
(Continued)

*Primary Examiner* — Anthony J Amoroso
(74) *Attorney, Agent, or Firm* — Sughrue Mion, PLLC

(57) ABSTRACT

A system includes an active system that executes processing, a standby system that is able to perform at least one of scale-up and scale-down, and a control apparatus that controls system switching to set the standby system undergoing the scaled up or scaled down as a new active system.

21 Claims, 12 Drawing Sheets

(51) Int. Cl.
  *G06F 13/00* (2006.01)
  *G06F 9/50* (2006.01)
  *G06F 9/455* (2018.01)

(52) U.S. Cl.
  CPC ............ *G06F 9/5077* (2013.01); *G06F 11/20* (2013.01); *G06F 13/00* (2013.01); *G06F 2009/4557* (2013.01); *G06F 2009/45595* (2013.01); *G06F 2201/815* (2013.01)

(58) Field of Classification Search
  CPC .. G06F 9/45558; G06F 9/5061; G06F 9/5077; G06F 13/00; G06F 13/14; G06F 13/4009; G06F 13/4022; G06F 2009/4557; G06F 2009/45595; G06F 2201/815
  See application file for complete search history.

(56) References Cited

U.S. PATENT DOCUMENTS

| | | | |
|---|---|---|---|
| 9,229,754 B2* | 1/2016 | Soundararajan | G06F 9/5077 |
| 2002/0013802 A1* | 1/2002 | Mori | G06F 9/5016 718/1 |
| 2010/0083010 A1 | 4/2010 | Kern et al. | |
| 2010/0268687 A1 | 10/2010 | Zembutsu | |
| 2011/0271126 A1 | 11/2011 | Hill | |
| 2012/0210117 A1 | 8/2012 | Murata | |
| 2013/0054776 A1* | 2/2013 | Kunze | G06F 9/5061 709/224 |
| 2013/0232504 A1 | 9/2013 | Yan et al. | |
| 2015/0172205 A1* | 6/2015 | Anderson | H04L 47/70 709/224 |

FOREIGN PATENT DOCUMENTS

| | | |
|---|---|---|
| JP | 8-335922 A | 12/1996 |
| JP | 2010033292 A | 2/2010 |
| JP | 4479930 B2 | 6/2010 |
| JP | 5011655 B2 | 8/2012 |
| JP | 2012-215937 A | 11/2012 |
| WO | 2010/023756 A1 | 3/2010 |

OTHER PUBLICATIONS

Communication dated May 30, 2018, from Canadian Intellectual Property Office in counterpart application No. 2975248.
ETSI GS NFV 002 V1.2.1 (Dec. 2014), "Network Functions Virtualisation (NFV); Architectural Framework", Dec. 2014, 21 pages.
Hikotoshi Nakazato, et al., "Proposal of Virtual Machine Placement Management Method considering System Redundancy", IEICE Technical Report, Nov. 7, 2013, pp. 63-68, vol. 113, No. 294.
Masashi Kaneko, et al., "A robust VNF allocation method in NFV", IEICE Technical Report, Jan. 15, 2015, pp. 29-34, vol. 114, No. 400.
International Search Report for PCT/JP2016/052803 dated Apr. 26, 2016 [PCT/ISA/210].
Notification of Reason for Refusal dated Apr. 24, 2019 from the Korean Intellectual Property Office in application No. 10-2017-7024207.

* cited by examiner

FIG. 2A
FIG. 2B
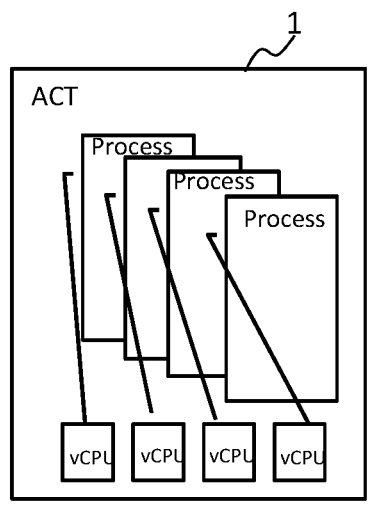
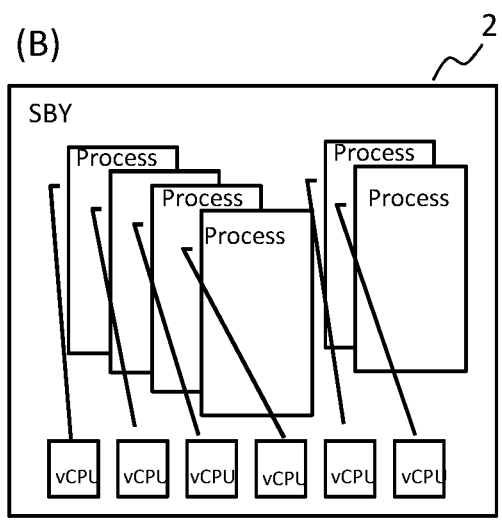
FIG. 2C
FIG. 2D
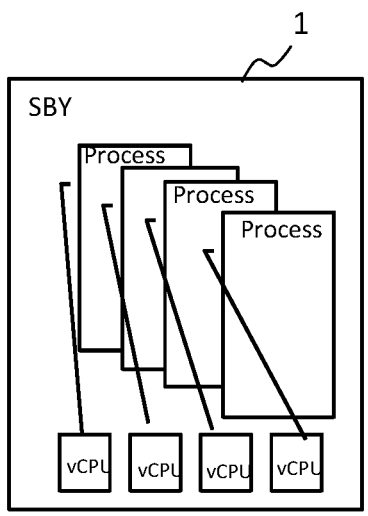
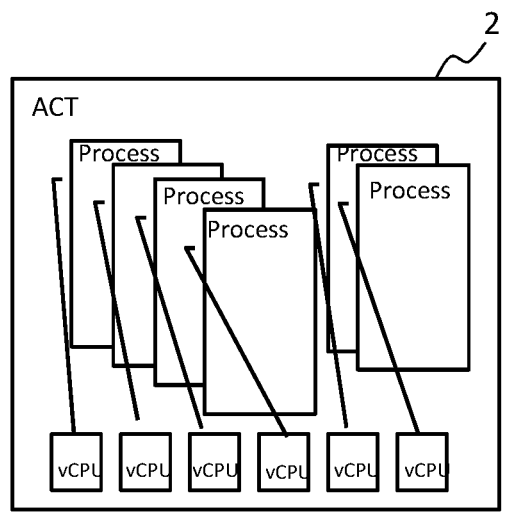

NODE SYSTEM, SERVER APPARATUS, SCALING CONTROL METHOD, AND PROGRAM

CROSS-REFERENCE TO RELATED APPLICATIONS

This application is a National Stage of International Application No. PCT/JP2016/052803, filed on Jan. 29, 2016, which claims the benefit of the priority of Japanese patent application No. 2015-017718 filed on Jan. 30, 2015, the disclosure of which is incorporated herein in its entirety by reference thereto.

TECHNICAL FIELD

The present invention relates to a node system constituting a network, server apparatus, scaling control method, and program.

BACKGROUND ART

In order to improve reliability, such a system is used in which a plurality of servers are combined to provide a redundant configuration (for instance, reference may be done to Patent Literature 1). For example, a duplex system comprises two servers having the same configuration, and, when one active (active) server (also termed as "operation system" server or "working system" server) fails, the system switches to and operates with a normal server apparatus (also termed as standby server (also termed as "waiting system" server or "reserve system" server)).

(N+1) redundancy system is a system wherein one server apparatus is arranged as a common reserve apparatus (standby server) for N number of server apparatuses (active servers).

In a hot standby system, for instance, data is synchronized between an active server and a standby server such that the standby server can take over service (processing) in an instant, when the active system server fails.

In a so-called cold standby system, a standby server stands by in a stopped state, and when an active server fails, the standby server is started up to switch over the operation and processing. The cold standby system, in which starting up and preparation of the standby server are executed after the active system server fails, has limitation in terms of system downtime and service continuation.

In a system called a warm standby (Warm Standby) system, when an active server operates, a standby server stands with power set on and with OS (Operating System) booted up (with database content being copied asynchronously), and, when the active system server fails, with network switching or the like, a user program such as a business application is invoked, and processing is transferred to the standby server.

Patent Literature 2 discloses the following server system. Out of servers each operating as an active system, a server in which a software for update is stored, transmits the software for update other server and instructs all servers each operating as a standby system to update to the software for update. When the update instruction is issued, the servers each operating as a standby system update software running on these servers to the software for update. After all the servers each operating as a standby system complete the update, the server in which the software for update is stored, switches active systems and standby systems of all of the set of servers.

Patent Literature 3 discloses the following system. The system comprises first and second databases operating on virtual machine with different performances, and exchanges virtual machines used by the system in response to an external instruction to perform scale up or scale down the performance of the system. At this time, the system performs data synchronization of the databases using a stream type replication function provided in each of the databases. After establishment of the data synchronization, the virtual machine that forwards an SQL (Structured Query Language) command is switched to another virtual machine. This configuration dynamically and inexpensively achieves the scale-up/down of a database equipped with a stream type replication function by utilizing the stream type replication function without stopping a Web service.

As a technology of virtualizing network functions, in addition to virtualization computing and storage of a server, NFV (Network Functions Virtualization) and so forth that realizes network functions by means of software using an application or the like running on a virtual machine (VM) implemented on a virtualization layer such as a hypervisor on a server is known. NFV is realized by a virtualization technology on a general-purpose server, as opposed to dedicated appliance (e.g., LTE (Long Term Evolution) mobile network node (e.g., MME (Mobility Management Entity), P-GW (Packet data network Gateway), S-GW (Serving Gateway), etc.)), and the functions can be changed by means of software at any time (e.g., refer to Non-Patent Literature 1).

[Patent Literature 1]
Japanese Patent No. 4479930B
[Patent Literature 2]
Japanese Patent No. 5011655B
[Patent Literature 3]
Japanese Patent Kokai Publication No. JP-P2012-215937A
[Non-Patent Literature 1]
ETSI GS NFV 002 V1.2.1 (2014-12), Network Functions Virtualisation (NFV); Architectural Framework, pp. 13-18, searched on Dec. 25, 2014, the Internet <URL: http://www.etsi.org/deliver/etsi_gs/NFV/001_099/002/01.02.01_60/gs_NFV002v010201p.pdf>

SUMMARY

Analysis of the related technologies are given below.

A technology that dynamically scales up (increasing processing performance) by increasing the number of virtual machines (VM) or scales down (decreasing processing performance) by decreasing the number of virtual machines (VM) according to the processing load of an application is known (e.g., Patent Literature 3). Patent Literature 3 discloses a technology for suppressing data transfer amount and an increase in cost spent in replacing a database when processing performance is changed according to load of the database. This technology dynamically achieves scales up/down without stopping a web application using a proxy that relays an SQL inquiry for an RDBMS (Relational Database Management System) having a stream type replication function and operating on a virtual machine instance provided by an IaaS (infrastructure as a Service).

The technology disclosed in Patent Literature 3, however, cannot effectively utilize resources due to the processing of increasing/decreasing VMs and a delay required for process allocation and taking over when the system is scaled up/down by increasing/decreasing VMs according to the processing load, and also has a problem of a process failure in a scale-down situation (findings by the present inventors).

A main object of the present invention, invented in consideration of the problems above, is to provide a system, apparatus, method, and recording medium storing a program each capable of reducing a processing delay in at least one of scale-up and/or scale-down.

According to an aspect of the present invention, there is provided a system comprising: an active system that executes processing; a standby system that is able to perform at least one of scale up and scale down; and control apparatus that controls system switching to switch the standby system undergoing the scale up or scale down to a new active system.

According to another aspect of the present invention, there is provided a server apparatus comprising: at least a standby system of a system that comprises an active system and the standby system, and an apparatus that performs scale up or scale down of the standby system in advance, and that switches the standby system to a new active system.

According to yet another aspect of the present invention, there is provided a server apparatus including at least a standby system of a redundant system constituted by an active system and the standby system, the server apparatus comprises a unit that switches the standby system to a new active system, after scaling (scaling up or scaling down) the standby system in advance.

According to another aspect of the present invention, there is provided a scaling control method comprising:

when performing scale up or scale down of an active system, switching, to a new active system, a scaled up or scaled down standby system provided as a switching target of an active system executing processing.

According to yet another aspect of the present invention, there is provided a computer-readable recording medium storing therein a program causing a computer to execute processing comprising:

when performing of scale up or scale down of the active system, switching a scaled up or scaled down standby system provided as a switching target of an active system executing processing to a new active system. According to the present invention, the computer-readable recording medium may be a non-transitory computer-readable recording medium (semiconductor memory or storage medium such as magnetic/optical recording medium) storing the program.

According to the present invention, a system, apparatus, method, and program capable of reducing a processing delay at the time of scaling (scale-up and/or scale-down) can be provided. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 2A, 2B, 2C, and 2D are diagrams illustrating the basic concept of the present invention.

PREFERRED MODES

After a basic configuration of the present invention is described first, an operating principle thereof and a comparative example will be described and then example embodiments will be described. Furthermore, an example in which the present invention is applied to NFV (Network Functions Virtualization) will be given.

<Basic Configuration of the Invention>

Figure 1:
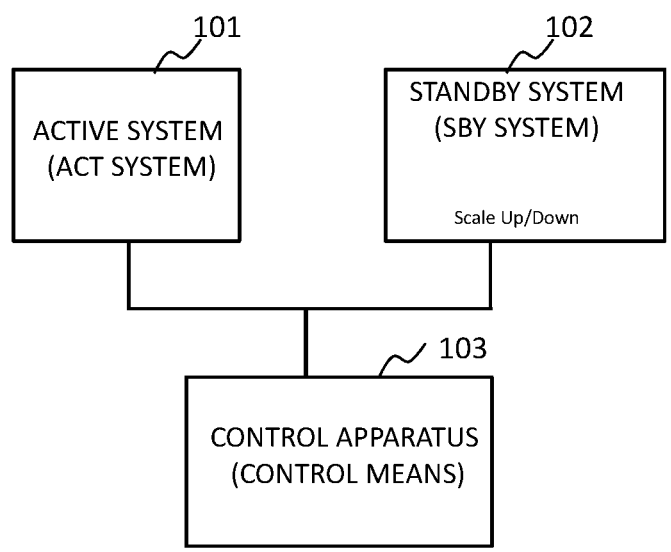
FIG. 1 is a diagram illustrating a summary of the present invention.

In FIG. 1, a system according to the present invention includes an active system 101 that executes processing, a standby system 102 that can be scaled up and/or scaled down, and a control apparatus (control means) 103 that controls system switching to switch the standby system 102 undergoing the scale up or scale down to a new active system.

For example, the control apparatus 103 instructs the standby system 102 to perform scale up or scale down, according to processing load or the like of the active system 101 (or, an instruction, and settings from a maintenance apparatus not shown in the drawing). The control apparatus 103 may be configured to receive a scaling (scale-up/scale-down) completion notification from the standby system 102 that has completed the scale-up or scale-down, and control system switching o set the standby system 102 undergoing the scaling (scale up/scale down) as the new active system and set the active system 101 before the system switching, as a new standby system.

The control apparatus 103 may be configured to control the new standby system (original active system, becoming a new standby system by system switching) to perform scale up/scale down in the same way as the new active system (original standby system that performs scale up/scale down before system switching).

The control apparatus 103 instructs the standby system 102 that has scaled up to switch to an active system, for instance, as a result of detecting processing load of the active system 101 before the system switching, or when determining that scaling up is required based on setting or instruction (e.g., input of a scaling up instruction) from the maintenance apparatus. For example, the system 101 (the original active system 101) that is to be set as a new standby system by system switching, may impose processing restriction on the system 102 (the original standby system 102) that is to be set as a new active system. Upon reception of a scale-up completion notification from the new standby system 101, the control apparatus 103 may release the processing restriction imposed on the system 102 that is set as a new active system.

The control apparatus 103 imposes processing restriction on the original active system 101 before the system switching and instructs the original standby system 102 before the system switching to perform scale down, for instance, as a result of detecting that the original active system 101 before the system switching has extra processing capabilities, or when determining that scaling down is required on the basis of settings or an instruction (e.g., input of a scaling down instruction) from the maintenance apparatus. Upon reception of a scale-down completion notification from the standby system 102 with the scaling down completed, the control apparatus 103 executes system switching, setting the standby system 102 with the scaling down completed as a new active system. The new active system takes over, from the original active system 101, the processing restriction imposed on the original active system 101 before the system switching. The control apparatus 103 may instruct the new standby system 101 (the original active system 101) to perform scale down. Upon reception of a scale-down completion notification from the new standby system 101, the control apparatus 103 may release the processing restriction (taken over from the original active system 101) imposed on the system 102 (the original standby system 102) that is set as a new active system by the system switching.

Scaling up and scaling down may be executed by increasing or decreasing virtual hardware resources such as a virtual CPU (virtual Central Processing Unit: vCPU) allocated to each virtual machine (VM) of the active and standby systems. In this case, scale up is a technique of increasing processing performance by increasing CPU, memory, etc., of a server allocated to the virtual machine (VM). Scaling down is a technique of decreasing processing performance by reducing CPU, memory, etc., of a server allocated to the virtual machine (VM). Here, scale up (scale down) improves (reduces) processing performance of a computer by upgrading (downgrading) specifications of CPU, memory, etc., provided in a computer as a single entity such as a server. Scale out (scale in) improves (reduces) the processing performance of a system by increasing (decreasing) the number of computers, such as servers. Improving (reducing) the processing performance of a virtual system by increasing (decreasing) virtual machines (VM) on a server corresponds to scale out (scale in) in terms of the number of the virtual machines (VM). But, increasing (decreasing) virtual machines (VM) on a server consequently improves (reduces) the processing performance of the server as a single entity, this can be said to be (equivalent to) scale up (scale down) of the server.

Depending on congestion or margin of processing of the active system 101 that performs session processing (e.g., call processing, etc.), the control apparatus 103 may instruct the standby system 102 which is a switching target of the active system, to perform scale up or scale down.

Virtual machines (VM) on which applications operate as active and standby applications, respectively, may be implemented on different servers or on the same server. When implementing virtual machines (VM) on which applications operate as active and standby applications, respectively, on the same serve, out of a plurality of virtual machines (applications operating on the virtual machines) on the server, one or more virtual machines (application(s) operating on the virtual machine) may each be configured to be an active system, and one or more other virtual machine (application(s) operating on the virtual machine) may each be configured to be a standby system. The server (physical machine) may include a virtual network function (VNF) on the virtual machine and an NFVI (Network Functions Virtualization Infrastructure) forming an execution infrastructure (virtualization infrastructure) for the VNF. The NFVI includes at least one of virtual computing, virtual storage, and virtual network configured by virtualizing at least one hardware resource of computing, storage, and network functions using a virtualization layer such as a hypervisor (corresponding to physical servers in FIG. 7, etc.). The server may include an OpenStack agent and its extension unit as a server agent. Moreover, in an application to NFV, active and standby systems may be configured by virtualization deployment units (VDU) on the NFVI.

<The Operating Principle of Scaling Up>

The operation of scale-up processing according to the present invention will be described with reference to FIGS. 2A, 2B, 2C, and 2D. FIGS. 2A and 2B schematically illustrate virtual CPUs (virtual Central Processing Unit: vCPU) in virtual machines on an active system (ACT system) server 1 and a standby system (SBY system) server 2, respectively, before system switching. In other words, the active system server 1 and the standby system server 2 comprise a virtual machine (VM) virtualized via a hypervisor (HV) not illustrated in the drawings, and the virtual machine comprises at least one virtual CPU (vCPU). FIGS. 2A and 2B illustrate virtual CPUs (vCPUs) allocated to a single virtual machine (VM) on the servers 1 and 2, respectively (virtual CPUs can be allocated up to a maximum number that can be allocated to a virtual machine). One process is assigned to each virtual CPU (vCPU). The number of threads that can be processed in parallel in a virtual machine (VM) is proportional to the number of virtual CPUs. In FIGS. 2A and 2B, one process is assigned to one virtual CPU (vCPU), for the sake of simplicity, however, a plurality of processes may be assigned to a single virtual CPU (vCPU). Moreover, a hypervisor, a virtual machine (VM), a guest OS (Operating System), etc., on a server are omitted, only for the sake of simplicity, in FIGS. 2A and 2B. A control apparatus (103 in FIG. 1) that controls system switching is also omitted in FIGS. 2A and 2B.

The standby system (SBY) in FIG. 2B is scaled up (in this case, two more virtual CPUs (vCPUs) are increased (Hotadded), compared to the active system (ACT) executing processing (e.g., session processing) in FIG. 2A. Note that "Hot add" is a function to dynamically add CPU(s) or memory(s) to a running system. For example, in Hotadd, device(s) (vCPUs in this example) can be added without stopping the virtual machine (VM), which is caused to recognize the added device(s) (vCPU).

The standby system (SBY) in FIG. 2B is configured as a hot standby system, and hence it is assumed that a process has been already assigned to each virtual CPU (vCPU) and data is synchronized with the active system (ACT) in FIG. 2A. Since the standby system (SBY) in FIG. 2B does not directly affect session processing, etc., a virtual machine (VM) can be started up (restarting a guest OS or a process). Session management function (HTTP (Hyper Text Transport Protocol) session) in SIP (Session Initiation Protocol) or J2EE (Java (registered trademark) 2 Platform, Enterprise Edition) (Servlet) may be used to manage initiation and termination of a session, though not limited thereto.

With the active system and the standby system being in states as illustrated in FIGS. 2A and 2B, respectively, when a system switching is executed, the standby system in FIG. 2B becomes a new active system (ACT) (FIG. 2D) and the active system in FIG. 2A a new standby system (SBY) (FIG. 2C). The new active system (the original standby system 2) in FIG. 2D takes over processing of the active system 1 (FIG. 2A), before the system switching, thereby making scale up of the processing performance possible. Virtual machines may be dynamically scaled up or scaled down by increasing or decreasing the number of CPU cores, memory such as RAM (Random Access Memory), disks (HDD (Hard Disk Drive)), and network interface controllers (NIC), in addition to the number of virtual CPUs (vCPUs). In other words, the dynamical scale up or scale down of virtual machines may be done by increasing or decreasing at least one of the number of virtual CPUs (the number of cores), virtual memory capacity, virtual disk storage area (capacity), and the number or bandwidth of virtual NICs (network interface controllers).

<The Operating Principle of Scaling Down>

Figure 3A:
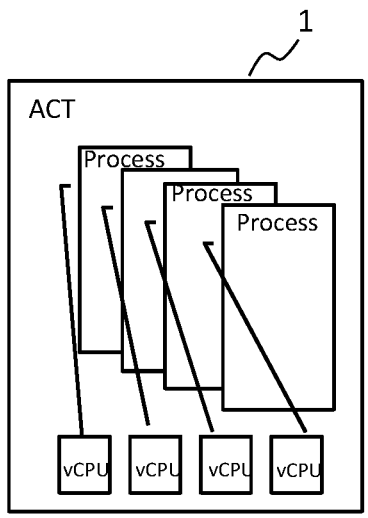
FIGS. 3A, 3B, 3C, and 3D are diagrams illustrating the basic concept of the present invention.
Figure 3B:
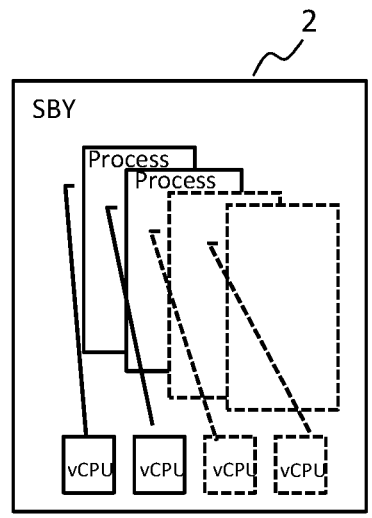
Figure 3C:
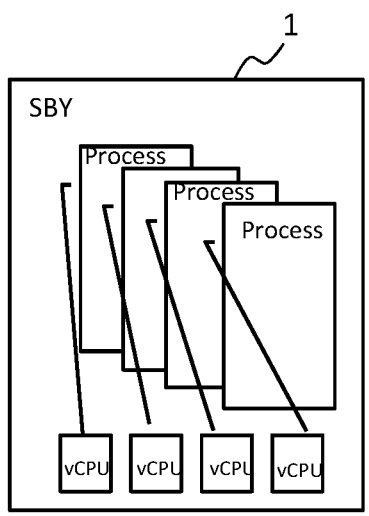
Figure 3D:
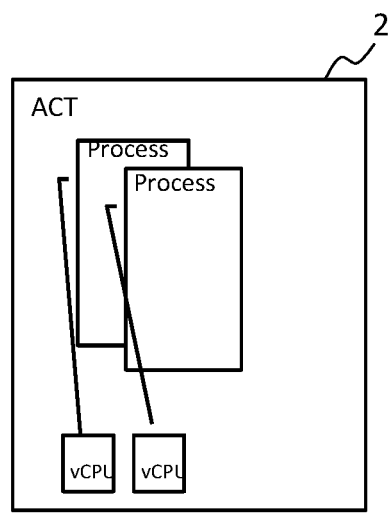

Next, the operation of scaling down will be described with reference to FIGS. 3A, 3B, 3C, and 3D. FIGS. 3A and 3B schematically illustrate virtual CPUs (vCPUs) in virtual machines on an active system (ACT system) server 1 and a standby system (SBY system) server 2, respectively, before system switching. Two virtual CPUs (vCPUs) have been deleted from the standby system (SBY) server 2 in FIG. 3B, as compared with the active system (ACT) server 1 in FIG. 3A, and processes assigned to the deleted virtual CPUs (vCPUs) have the allocation to these virtual CPUs (vCPUs) released and have terminated. With the active system and the standby system being in the states as illustrated in FIGS. 3A and 3B, when a system switching is executed, the standby system in FIG. 3B becomes a new active system (FIG. 3D) and the active system in FIG. 3A becomes a new standby system (FIG. 3C). As the new active system (ACT) (the original standby system 2) in FIG. 3D takes over processing of the active system 1 (FIG. 3A), before the system switching, the processing performance can be scaled down. Scaling down (Hotdel) the new standby system in FIG. 3C in the same way as the new active system in FIG. 3D, does not cause any problem. The reason is that session processing (call processing, etc.) will not be affected, even if there is a restarting of a process. Note that "Hotdel" is a function to dynamically delete CPUs or memory(s) from a running system. In this example, device(s) (e.g., vCPU(s), etc.) are deleted without stopping the virtual machine (VM).

COMPARATIVE EXAMPLE

Figure 4A:
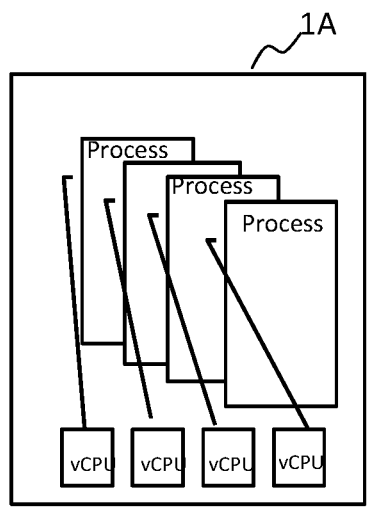
FIGS. 4A, 4B, 4C, and 4D are diagrams illustrating a comparative example.
Figure 4B:
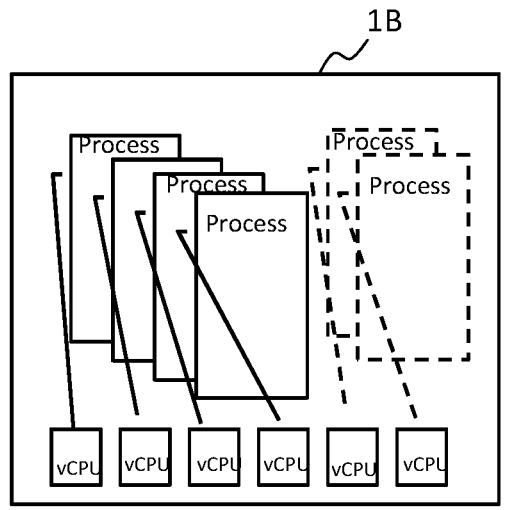

FIGS. 4A and 4B are diagrams illustrating scale up and scale down of a virtual machine in Comparative Example (an example of a case where the present invention is no applied: the case where ACT/SBY system is not used).

FIG. 4B is a diagram schematically illustrating a virtual machine on a server 1B scaled up by adding (Hotadd) virtual CPUs (vCPUs) to a server 1A in FIG. 4A. In FIG. 4B, the server 1B only has the virtual CPUs (vCPUs) added (Hotadd) and cannot yet accomplish effective utilization of resources. In other words, until processes are assigned to the added virtual CPUs (vCPUs) and started, the added virtual CPUs (vCPUs) do not contribute to improvement of processing capability of the server 1B.

Figure 4C:
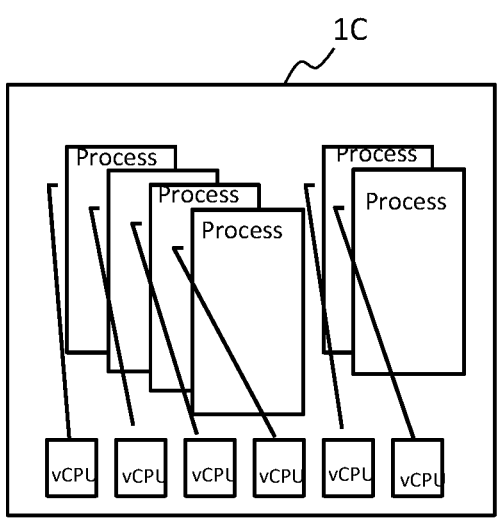
Figure 4D:
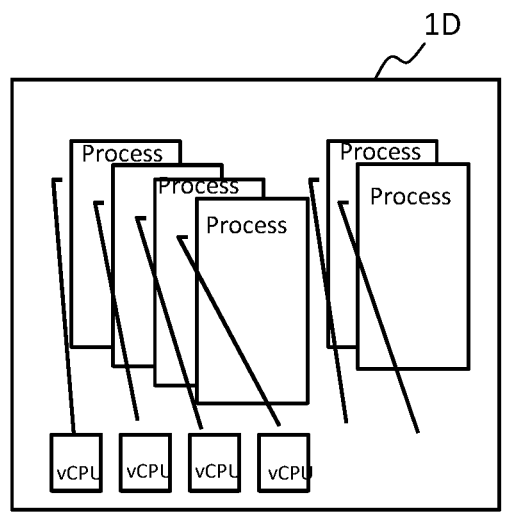

FIG. 4D is a diagram schematically illustrating a virtual machine (VM) on a server 1D scaled down by removing (Hotdel) virtual CPUs (vCPUs) from a server 1C in FIG. 4C. The server 1C executes processing using six virtual CPUs. When two virtual CPUs (vCPUs), as illustrated in FIG. 4D are to be removed in a state in which processes and threads are still assigned to these virtual CPUs (vCPUs), there is a case in which the processes assigned to the virtual CPUs may fail. Due to this process failure, for example, a takeover (maintenance) of a session from a virtual machine on the server 1C to a virtual machine on the server 1D may fail as well, wherein the session has been done until then by the virtual machine on the server 1C As described, in Comparative Example that is not configured to have active and standby systems, when a virtual machine (VM) is scaled up, there is a delay before added virtual hardware resource (virtual CPU(s), etc.) starts contributing to improvement of processing performance (assigning a process to virtual CPU and so forth requires a time), as a result of which efficient utilization of resources cannot be achieved. In the above described Comparative Example, when a virtual machine (VM) is scaled down, there is a possibility that a process may fail or session takeover (maintenance) may fail, and this may become even a factor for inhibiting improvement of stability of the system and also lead to service degradation. Note that improving (reducing) processing performance of a virtual machine by increasing or decreasing virtual CPU (vCPU) corresponds to scale out (scale in) that increases or decreases the number of virtual CPU (vCPU), if focusing on virtual CPU (vCPU). However, since this consequently improves (reduces) processing performance of a single virtual machine (VM), this can be an equivalent to perform scale up (scale down) of a virtual machine (VM).

EXAMPLE EMBODIMENTS

Next, Example Embodiments of the present invention will be described.

<System Configuration>

Figure 5:
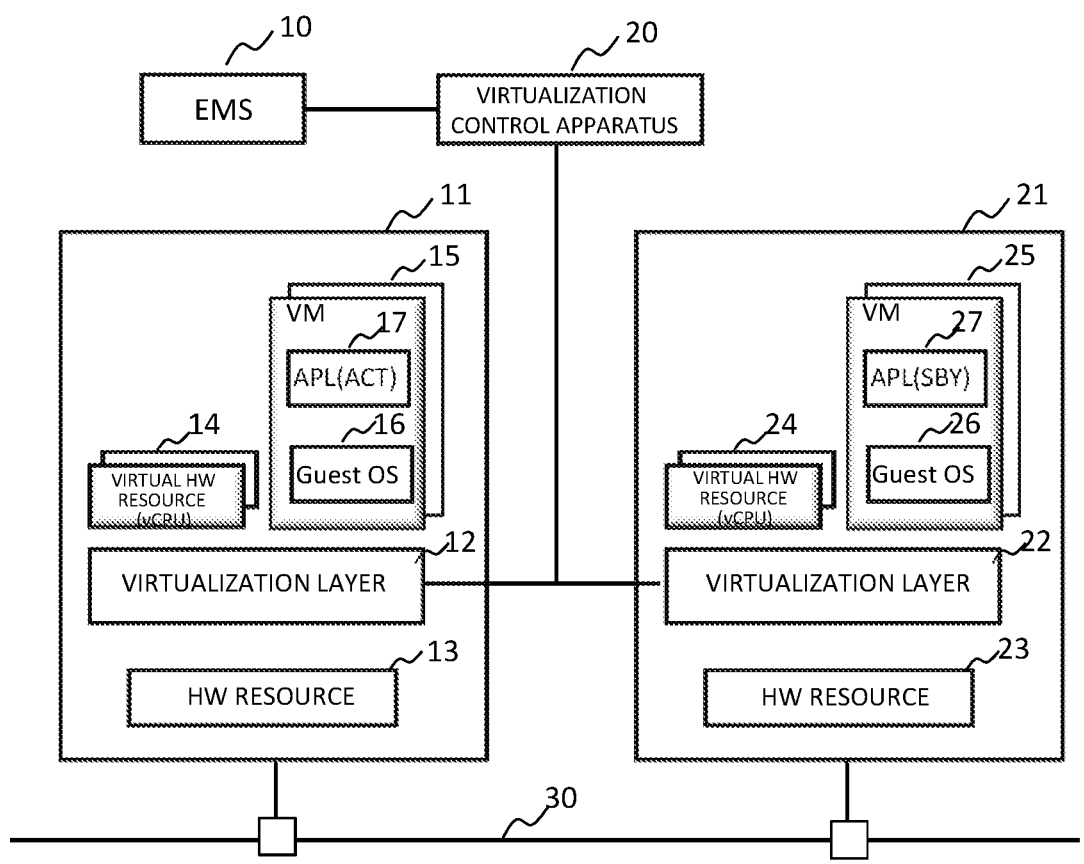
FIG. 5 is a diagram illustrating a configuration example of a system of an example embodiment of the present invention.

FIG. 5 is a diagram illustrating a configuration example of a system of the present example embodiment. In FIG. 5, an application (software) (Application: APL) 17 running on a virtual machine (VM) 15 on a server (physical machine: PM) 11 constitutes an active system (ACT system). More specifically, the server 11 includes hardware (HW) resources 13, such as computing hardware (e.g., CPU core), storage hardware (HDD, RAM (Random Access Memory), etc.), and network hardware, a virtualization layer 12 such as a hypervisor constituting a virtualization function, a virtual hardware resource 14 such as a virtual CPU (vCPU) obtained by virtualizing the hardware resource 13 using the virtualization layer 12, and virtual machine(s) 15. In the virtual machine 15, application 17 (ACT system) is executed on a guest OS 16 to implement a virtualization network function (VNF), for example, on a software basis. Though FIG. 5 illustrates a plurality of the virtual machines 15 (two in FIG. 5), the number of the virtual machines 15 is not limited to the configuration in FIG. 5. Only for the sake of convenience of explanation, the virtual hardware resources 14 and 24, such as virtual CPUs (vCPUs) and so forth, are arranged on the virtualization layers 12 and 22 in parallel with the virtual machines 15 and 25 in FIG. 5.

An application (software) (APL) 27 running on a virtual machine (VM) 25 on a server (physical machine) 21 constitutes a standby system (SBY system). The basic configuration of the server 21 is the same as that of the active system server 11. In a case where the application 27 on the virtual machine 25 of the standby system server 21 stands by, in a state where the current active system is scaled up, the virtual hardware resources such as virtual CPUs (vCPUs) allocated to the standby system are increased and processes are assigned to the added virtual CPUs (vCPUs) (refer to FIG. 2B). In a case where the application 27 on the virtual machine 25 of the standby system server 21 stands by I a state where the current active system is scaled down, assignment of the processes to the virtual CPUs (vCPUs) of the virtual machine to be removed is released, and then the virtual hardware resources, such as virtual CPUs (vCPUs) and so forth, to be removed, are removed.

EMS (Element Management System) 10 is a maintenance management system that manages, configures, and maintains a virtual machine, for example. EMS 10 communicates with a virtualization control apparatus (also referred to as "virtualization infrastructure") 20.

The virtualization control apparatus 20 monitors and controls the virtual machines 15 and 25 on the servers 11 and 21. That is, the virtualization control apparatus 20 communicates with the virtualization layers 12 and 22 such as hypervisors of the servers 11 and 21, for example, exchanges information regarding configuration and state of the virtual machines (VM), and information regarding the configuration and state of virtualized hardware resources, such as the virtual CPUs allocated to the virtual machines, performs deployment and control of a virtual machine, control of system switching, and communication with EMS 10. The servers 11 and 21 are connected by a network 30, such as a LAN (Local Area Network), for example.

When applications on virtual machines of the servers 11 and 21 having different IP (Internet Protocol) addresses perform system switching according a hot standby scheme and the application on the virtual machine of a new active system server takes over an IP address of the server having an original (before the system switching) active application, an alias IP address may be taken over (the servers 11 and 21 have the same alias IP address). Alternatively, LAN adapters of the servers may be switched. Or, such a scheme may be also adopted in which an IP address is not taken over at a time of system switching.

In the example of FIG. 5, the applications (on the virtual machines) 17 and 27 of the active and standby systems run on the different servers (physical machines) 11 and 21, but they may run on the same server. Furthermore, one or multiple combinations of a plurality of applications running on a plurality of virtual machines on a single server (physical machine) may be set to an active system, while remaining application may be set to a standby system. A plurality of applications running on a plurality of virtual machines on a single server (physical machine) may all be set to an active system, while a plurality of applications running on a plurality of virtual machines on another server (physical machine) all may be set to a standby system. A server with application(s) running on virtual machine(s) thereon being of an active system may be also referred to as an "active system server", for the sake of simplicity. A server with application(s) running on virtual machine(s) thereon being of a standby system may be also referred to as a "standby system server", for the sake of simplicity.

<Correspondence Relation to the NFV Reference Architectural Framework>

Figure 11:
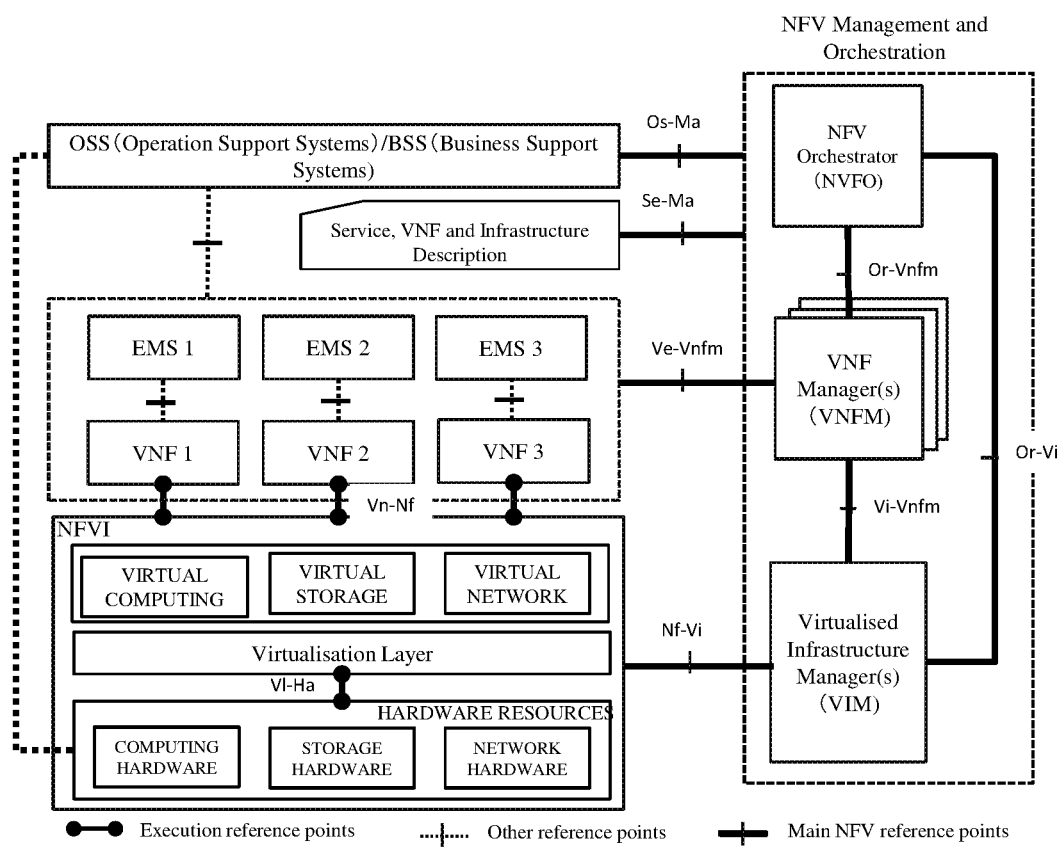
FIG. 11 is a diagram illustrating NFV.

FIG. 11 is cited from FIG. 4 in Chapter 7 of Non-Patent Literature 1, as a reference and illustrates NFV reference architectural framework defined by NFV (Network Function Virtualization) ISG (Industry Specification Groups).

The servers 11 and 21 of the present example embodiment described with reference to FIG. 5 correspond to the NFV reference architecture as follows.

In FIG. 11, VNFs (Virtual Network Functions) 1 to 3 correspond to, for example, the applications operating on the virtual machines (VM) in FIG. 5. For VNFs 1 to 3, network functions (e.g., MME (Mobility Management Entity), S-GW (Serving Gateway), P-GW (PDN Gateway), etc., in EPC (Evolved Packet Core) that is a core network of LTE (Long Term Evolution) network) may be implemented by software (virtual machine). In NFV ISG, a management function called EMS (Element Management System) is specified for each VNF.

In the NFV reference architecture illustrated in FIG. 11, NFVI (Network Function Virtualization Infrastructure) that constitutes an implementation infrastructure of each VNF is an infrastructure that allows hardware resources (13 and 23 in FIG. 5) of a physical machine (server) such as computing, storage, and network functions to be flexibly handled as virtualized hardware resources (14 and 24 in FIG. 5) such virtualized computing, virtualized storage, virtualized network, and so on which have been virtualized using a virtualization layer (12 and 22 in FIG. 5) such as a hypervisor.

Further, the virtualization control apparatus 20 in FIG. 5 can be associated with NFV Management and Network Orchestration (MANO) of the NFV reference architecture in FIG. 11. In FIG. 11, NFV MANO includes NFV-Orchestrator (NFVO), VNF-Manager (VNFM), and Virtualized Infrastructure Manager (VIM).

NFV-Orchestrator (NFVO) orchestrates and manages NFVI and VNF, and realizes network service on NFVI (resource allocation to the VNF, and VNF management (auto-healing, auto-scaling, life cycle management of VNF, etc.)).

VNF-Manager (VNFM) manages VNF's life cycle (instantiation, update, query, scaling, healing, termination, etc.).

Virtualized Infrastructure Manager (VIM) controls NFVI via a virtualization layer (computing, storage, network resource management, failure monitoring of NFVI that is an execution infrastructure of VNF, resource information monitoring, etc.).

Service, VNF and Infrastructure Description defines a template (descriptor) of information required for network services (NS) and VNF deployment.

NSD (Network Service Descriptor): a template describing requirements and restriction conditions for NS deployment.

VLD (Virtual Link Descriptor): a template describing resource requirements for a logical link that connects VNF and PNF constituting NS.

VNFFGD (VNF Forwarding Graph Descriptor): a template describing logical topology and allocation of NS.

VNFD (VNF Descriptor): a template describing requirements and restriction conditions for VNF deployment.

PNFD (Physical Network Function Descriptor): a template describing physical network function connectivity, external interface, and KPIs (Key Performance Indicators) requirements of Virtual Link. NSD, VNFFGD, and VLD are included in an NS catalogue, while VNFD is included in an VNF catalogue.

OSS (Operations Support Systems) are a generic term for systems (such as apparatuses, software, and schemes) necessary for telecommunications carriers (carriers) to construct and manage services, for example. BSS (Business Support systems) are a generic term for information systems (such as apparatuses, software, and schemes) to be used for accounting for and charging of a usage charge and handling of a customer by the telecommunications carriers.

In FIG. 11, Os-Ma is a reference point between OSS (Operation Service Systems)/BSS (Business Service Systems) and NFV-MANO, and is used for lifecycle management request of network service, VNF lifecycle management request, forwarding of NFV related state information, exchange of policy management, etc. A reference point Or-Vnfm is used for resource related requests (authorization, reservation, allocation, etc.) by VNF Manager (VNFM), forwarding of configuration information to VNFM, and collection of state information of VNF. A reference point Vi-Vnfm is used for resource allocation request from VNFM, such as query, allocation/release, etc., of NFVI resource, and exchange of virtualized resource configuration and state information. A reference point Or-Vi is used for reservation/release, and allocation/release/update of NFVI resource by NFVO, and exchange of virtualized resource configuration and state information such as addition/deletion/update of NFVI software image.

A reference point Ve-Vnfm is used for VNF lifecycle management request, and exchange of configuration information and state information between EMS and VNFM and between VNFM and VNFM. A reference point Nf-Vi is used for allocation of VM, along with instructions of computing/storage resource, updating VM resource allocation, VM migration, VM termination, assignment of virtualized resources in response to resource allocation requests such as creating/deleting a connection between VMs, forwarding of virtualized resources state information, and exchange of hardware resource configuration and state information. A reference point Se-Ma is used for information model query, etc., of NFV deployment template and NFV infrastructure. A reference point Vi-Ha interfaces a virtualization layer to hardware resources to create an execution environment for VNF, and collects state information for VNF management. A reference point Vn-Nf represents an execution environment provided by NFVI to VNF (refer to Non-Patent Literature 1 for details).

<Configurations of Control Units of the Server and the Virtualization Control Apparatus>

Figure 6:
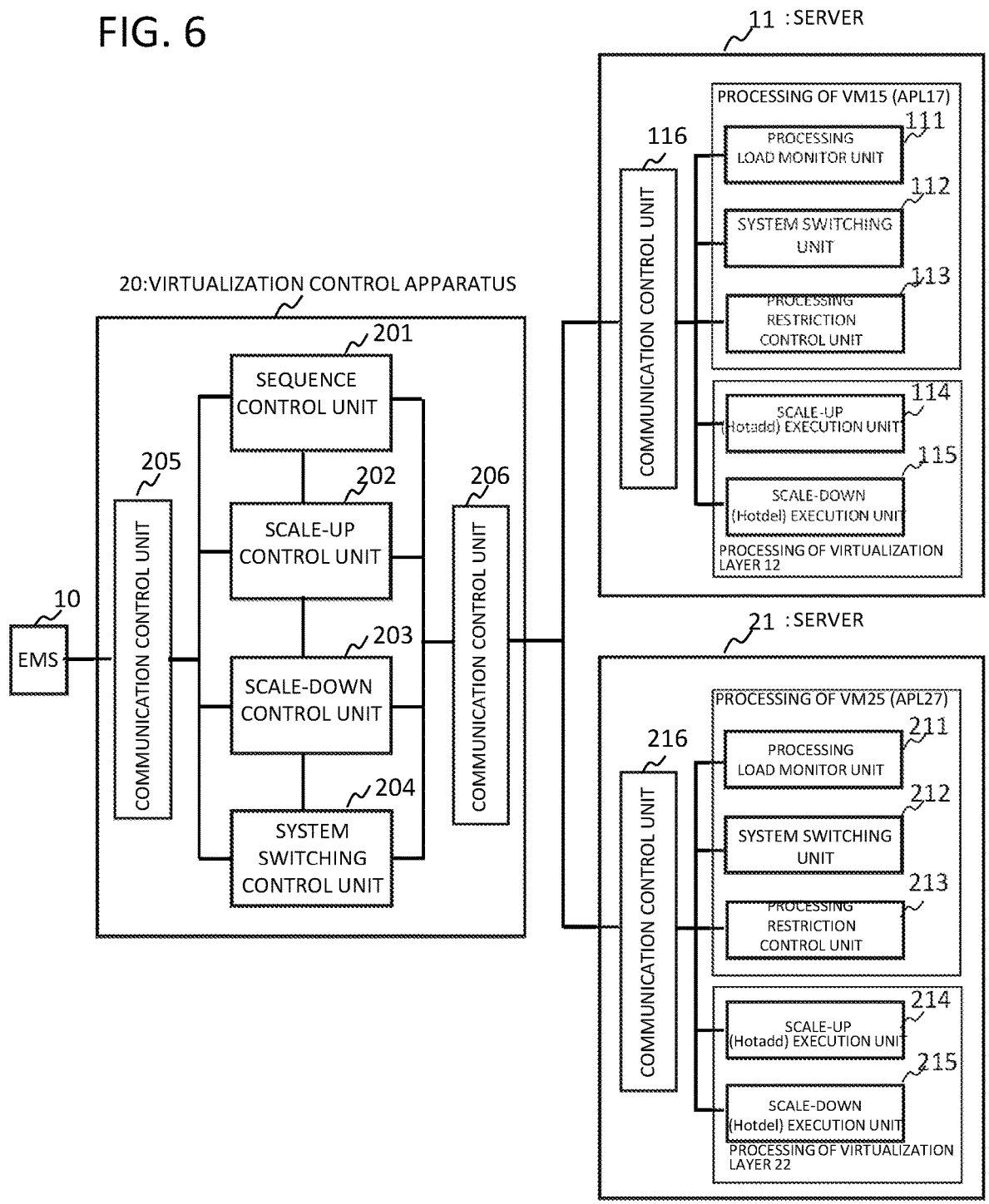
FIG. 6 is a diagram illustrating configuration examples of a virtualization control apparatus and servers of an example embodiment of the present invention.

FIG. 6 is a diagram schematically illustrating control functions of the virtualization control apparatus 20 and the servers 11 and 21 in FIG. 5, regarding scale up and scale down.

<Servers>

In FIG. 6, the server 11 includes a processing load monitor unit 111, a system switching unit 112, processing restriction control unit 113, a scale-up execution unit 114, a scale-down execution unit 115, and a communication control unit 116. Out of these, the processing load monitor unit 111, the system switching unit 112, and the processing restriction control unit 113 may be implemented by processing of applications operating on the virtual machine (VM) 15 in FIG. 5, for example. The scale-up execution unit 114 and the scale-down execution unit 115 may be implemented by processing of the virtualization layer 12 (hypervisor) in FIG. 5.

The processing load monitor unit 111 monitors processing load of a virtual machine, and detects processing congestion and a processing margin. When detecting processing congestion or a processing margin, the processing load monitor unit 111 notifies EMS 10 via a transmission unit (not illustrated) of the communication control unit 116.

The system switching unit 112 executes system switching. When the application 17 that runs on the virtual machine 15 on its own server 11 is active, the system switching unit 112 switches the application 17 on the server 11 to a standby system, and instructs the application 27 on the server 21 to switch to an active system.

When the application 17 that operates as a standby system on the virtual machine 15 on its own server 11, the system switching unit 112 switches the application 17 on the server 11 to an active system according to an instruction received from a system switching unit of the server 21 in which the application 27 operates on the virtual machine 25 as an active system. When switching the application 17 operating on the virtual machine 15 on its own server 11 from a standby system to an active system, the system switching unit 112 controls takeover of various settings, such as processing and execution environment, from the application 27 operating as an active system on the virtual machine 25.

When the application 17 operating on the virtual machine 15 on its own server 11 is switched from an active system to a standby system, the processing restriction control unit 113 instructs the application 27, which is to be switched from a standby system to a new active system, to impose processing restriction, and, after completion of scale up in the own server 11, the application 27 switched to a new active system is instructed to release the processing restriction.

When the application 17 operating on the virtual machine 15 on its own server 11 is switched from a standby system to an active system, the processing restriction control unit 113 releases processing restriction on the application 17 on its own server 11, upon reception of a request to release processing restriction from the virtualization control apparatus 20 via the communication control unit 116.

Upon reception of a scale-up request from the virtualization control apparatus 20 via the communication control unit 116 (a transmission unit: not illustrated), the scale-up execution unit 114 increases virtual hardware resources (e.g., virtual CPUs) (14 in FIG. 5) to be allocated to a virtual machine. The scale-up execution unit 114 controls process assignment to added virtual CPUs. The scale-up execution unit 114 notifies the virtualization control apparatus 20 of scale-up completion via the communication control unit 116, after completion of the scale-up.

Upon reception of a scale-down request from the virtualization control apparatus 20 via the communication control unit 116, the scale-down execution unit 115 decreases virtual hardware resources (e.g., virtual CPUs) (14 in FIG. 5) allocated to a virtual machine. At this time, the scale-down execution unit 115 releases process assignment to the removed virtual CPUs. The scale-down execution unit 115 notifies the virtualization control apparatus 20 of scale-down completion via the communication control unit 116, after scale-down completion.

In the server 11, the processing load monitor unit 111, the system switching unit 112, and the processing restriction control unit 113 may be implemented by, for example, processing of the application (APL) 17 operating on the virtual machine (VM) 15 in FIG. 5. The scale-up execution unit 114 and the scale-down execution unit 115 may be realized by the processing of the virtualization layer 12 (hypervisor (HV)) in FIG. 5. Alternatively, in a virtualization scheme in which an OS (Operating System) called a management OS is made to operate as one of virtual machines (VMs), a device driver is provided in the management OS, and an access from a virtual machine to a hardware is made via the management OS, each unit described above may be implemented on the virtual machine of the management OS.

The server 21 is configured identically to the server 11. In the server 21, a processing load monitor unit 211, the system switching unit 212, and processing restriction control unit 213 may be implemented by, for example, processing of the application (APL) 27 operating on the virtual machine (VM) 25 in FIG. 5. The scale-up execution unit 214 and the scale-down execution unit 215 may be implemented by processing of the virtualization layer 22 (hypervisor (HV)) in FIG. 5. The servers are assumed to communicate with each other via (transmission/reception units, not illustrated, of) the communication control units 116 and 216 of the servers 11 and 21.

A part or all of functions of the communication control units, the virtualization layers, and the virtual machine server of the servers 11 and 21 may be implemented by programs executed on processors (CPUs), not illustrated, constituting the servers 11 and 21, respectively. In this case, the processors each may implement each function by reading the program stored in a memory (semiconductor memory, HDD, etc.), not illustrated, provided in or connected to the servers 11 and 21 into a main memory and executing the program (instructions) by means of software, or in cooperation between software and hardware.

<Virtualization Control Apparatus>

In FIG. 6, the virtualization control apparatus 20 includes a sequence control unit 201, a scale-up control unit 202, a scale-down control unit 203, a system switching control unit 204, a communication control unit 205 that controls communication with EMS 10, and a communication control unit 206 that controls communication with the servers 11 and 21. Note that the communication control units 205 and 206 are configured as separate units in FIG. 6, but they can be merged into one communication control unit.

The sequence control unit 201 controls a sequence of scale-up and scale-down operations by activating the scale-up control unit 202, the scale-down control unit 203, and the system switching control unit 204, and providing required information thereto.

Upon reception of a notification of processing congestion or a processing margin in a virtual machine from the active system server out of the servers 11 and 21 via the communication control unit 206, the sequence control unit 201 controls a scale-up or scale-down sequence.

In a scale-up sequence, the sequence control unit 201 starts the scale-up control unit 202.

The scale-up control unit 202 instructs (the hypervisor (HV) of) the scale-up target server to execute scale up, such as increasing virtual CPUs, etc. Note that the scale-up control unit 202 may instruct information such as the number of added virtual CPUs to the scale-up unit of the server.

Upon reception of a scale-up completion notification from, for example, the application switched from an active system to a standby system via the communication control unit 206, the sequence control unit 201 starts the system switching control unit 204.

The system switching control unit 204 instructs (an active application of) the server in which the application operates as an active system on the virtual machine, to execute system switching via the communication control unit 206. The application of an active system, on reception of a system switching instruction from the virtualization control apparatus 20, transitions to a standby system, and then instructs (an application of a standby system of) the server in which the application operates as a standby system on the virtual machine, to transition to an active system.

Upon reception of a system switching completion notification from the application on the server, the sequence control unit 201 notifies EMS 10 via the communication control unit 205 of a scale-up completion notification.

In a scale-down sequence, the sequence control unit 201 starts the scale-down control unit 203.

The scale-down control unit 203 instructs (the hypervisor (HV) of) the scale-down target server to perform scale down by decreasing virtual CPUs. Note that the scale-down control unit 203 may instruct information such as the number of decreased virtual CPUs to the scale-down unit (hypervisor (HV)) of the server.

Upon reception of a scale-down completion notification from the server in which an application operates on the virtual machine as a standby system, via the communication control unit 206, the sequence control unit 201 starts the system switching control unit 204.

The system switching control unit 204 instructs (an active application of) the server in which an application operates on the virtual machine as an active system, to execute system switching via the communication control unit 206. The application of an active system, upon reception of the system switching instruction from the virtualization control apparatus 20, transitions to a standby system, and then instructs the application of a (original) standby system before the system switching to transition to an active system.

Upon reception of a system switching completion notification from the application undergoing switching from an active system to a standby system, for example, the sequence control unit 201 notifies EMS 10, via the communication control unit 205, of scale down completion notification.

At part or all of functions of at least a part of the units 201 to 206 of the virtualization control apparatus 20 may be implemented by a program executed by a processor (CPU), not illustrated, constituting the virtualization control apparatus 20. In this case, the processor may implement each function by reading, into a main memory, a program stored in a memory (semiconductor memory, HDD, etc.), not illustrated, provided in or connected to the virtualization control apparatus 20 and executing the program (instructions), by means of software or in cooperation of software and hardware.

<Scale-Up Sequence>

Figure 7:
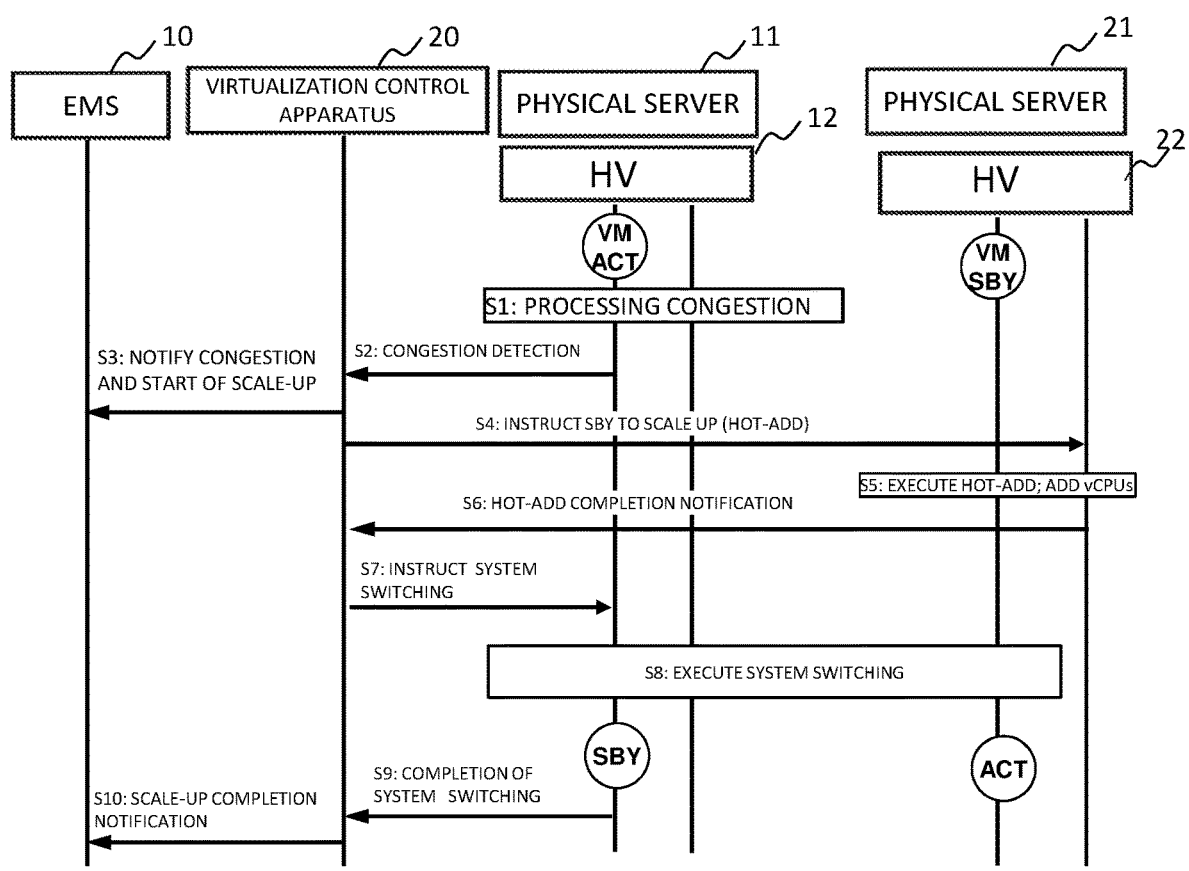
FIG. 7 is a diagram illustrating a scale-up operation in an example embodiment of the present invention.

FIG. 7 is a diagram schematically illustrating an example of a scale-up sequence in the system of the Example Embodiment described with reference to FIGS. 5 and 6.

In FIG. 7, the physical servers 11 and 21 correspond to the servers (physical machines: PM) 11 and 21 in FIGS. 5 and 6. It should be noted that the physical servers 11 and 21 are for specifying that the servers are physical machines (PM) (the servers 11 and 21 are different devices (units)) and they will be simply referred to as the servers 11 and 21 hereinafter. FIG. 7 illustrates the virtualization layers 12 and 22 in FIG. 6, as hypervisors (HV) 12 and 22, respectively. "VM ACT" and "VM SBY" denote applications of an active system (ACT) and a standby system (SBY) on virtual machines (VM), respectively. The applications may be VDUs (Virtualization Deployment Units) of NFV or the like. "VM ACT" and "VM SBY" may be VMs of an active system and a standby system, respectively. In FIG. 7, numbers (step numbers) are given to typical sequences, for the sake of explanation. The same may be said in FIGS. 8 to 10 described later.

The processing load monitor unit 111 of the server 11 detects processing congestion in an application operating on the virtual machine (S1).

The processing load monitor unit 111 of the server 11 notifies the virtualization control apparatus 20 of congestion detection (S2).

Upon reception of a notification of congestion detection, the sequence control unit 201 in the virtualization control apparatus 20 notifies EMS 10 of the congestion in the application on the server 11 and of start of a scale-up (S3).

The sequence control unit 201 of the virtualization control apparatus 20 starts the scale-up control unit 202, which then instructs the server 21 (hypervisor (HV)) in which the application 27 operates on the virtual machine 25 as a standby system (SBY), to execute scale up (Hotadd) (S4).

Upon reception of the scale-up instruction, the scale-up execution unit 214 (e.g., implemented on the hypervisor (HV)) of the server 21 executes hot-add processing (S5), increases virtual CPUs (vCPUs) to be allocated to the virtual machine 25 on which the application 27 of a standby system (SBY) runs (adding vCPUs), assigns processes to these virtual CPUs (vCPUs), and transmits a scale-up completion notification (Hotadd completion notification) to the virtualization control apparatus 20 (S6).

Upon reception of the scale-up (hot-add) completion notification, the sequence control unit 201 of the virtualization control apparatus 20 starts the system switching control unit 204, which then transmits a system switching instruction to the system switching unit 112 (e.g., an application on the VM) of the server 11 in which the application operates on the virtual machine as an active system (ACT) (S7).

In response to the system switching instruction, system switching of the applications is performed between the servers 11 and 21 (S8). The system switching unit 112 of the server 11 in which the application 17 operates on the virtual machine 15 as an active system (ACT), switches the application 17 to a standby system (SBY), and instructs the server 21 in which the application 27 operates on the virtual machine 25 as a standby system (SBY), to transition to an active system (ACT), for example. As a result, the system switching unit 212 of the server 21, in which the application 27 operates on the virtual machine 25 as a standby system (SBY), sets the application 27 to an active system (ACT) (switches the application 27 from a standby system to an active system).

The server 11 (the application 17 thereof) in which the application 17 operating on the virtual machine 15 is switched from an active system (ACT) to a standby system (SBY) as a result of the system switching, notifies the virtualization control apparatus 20 of completion of system switching (S9).

The sequence control unit 201 of the virtualization control apparatus 20, upon reception of notification of the completion of system switching, transmits a scale-up completion notification to tEMS 10 (S10).

<Scale-Down Sequence>

Figure 8:
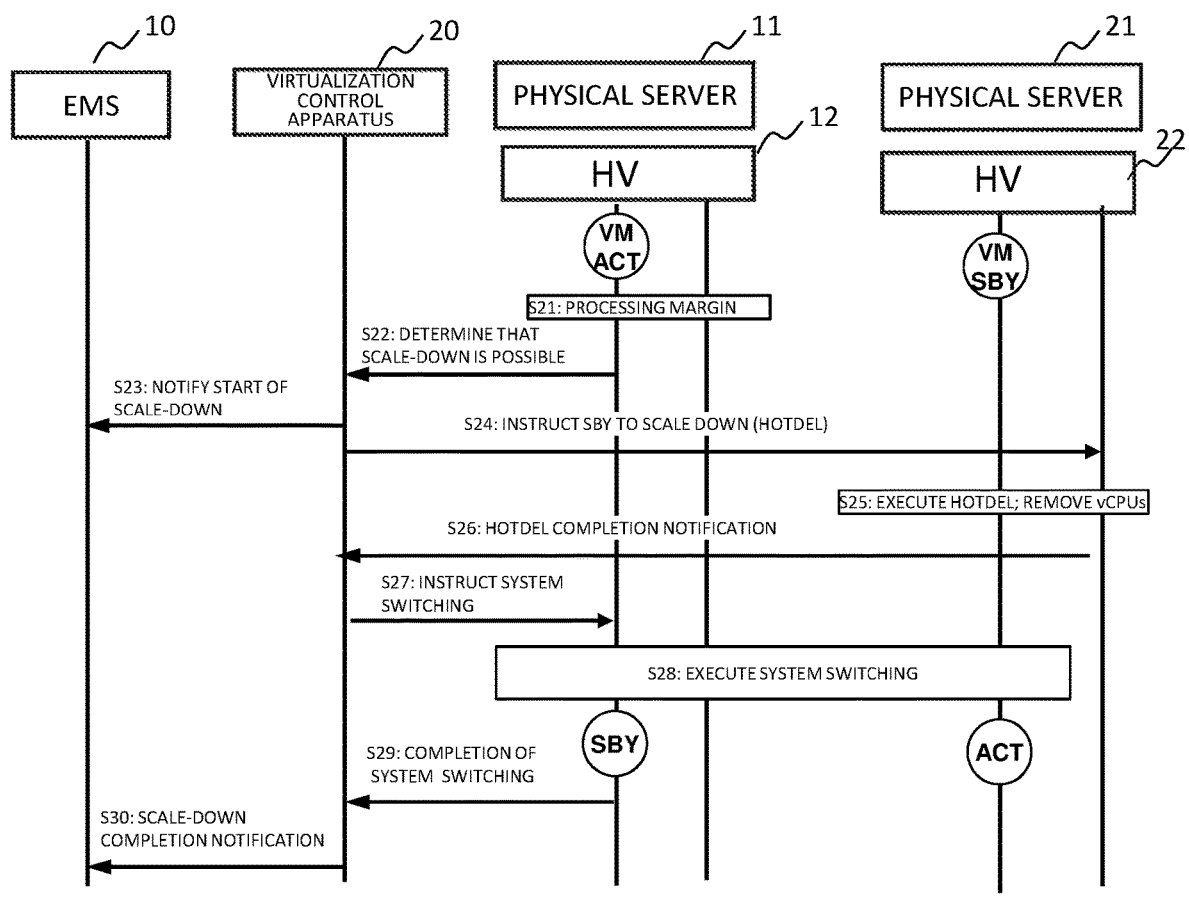
FIG. 8 is a diagram illustrating a scale-down operation in an example embodiment of the present invention.

FIG. 8 is a diagram schematically illustrating an example of a scale-down sequence in the system of the example embodiment described with reference to FIGS. 5 and 6.

In FIG. 8, the physical servers 11 and 21 correspond to the servers (physical machines: PM) 11 and 21 in FIGS. 5 and 6. The hypervisors (HV) 12 and 22 in FIG. 8 correspond to the virtualization layers 12 and 22 in FIGS. 5 and 6. In FIG. 8, "VM ACT" and "VM SBY" denote the applications of an active system (ACT) and a standby system (SBY) on the virtual machines (VM), respectively. "VM ACT" and "VM SBY" may be VMs of an active system (ACT) and a standby system (SBY), respectively. In FIG. 8, numbers (step numbers) are given to typical sequences, for the sake of explanation.

The processing load monitor unit 111 of the server 11 detects processing margin in the virtual machine (S21).

The processing load monitor unit 111 of the server 11 determines that scale-down is possible due to the processing margin and notifies the virtualization control apparatus 20 (S22).

Upon reception of the notification from the server 11, the sequence control unit 201 in the virtualization control apparatus 20 notifies EMS 10 of start of scale down in the server 11 (S23).

The sequence control unit 201 of the virtualization control apparatus 20 starts the scale-down control unit 203, which then instructs the server 21 (hypervisor (HV)) in which the application 27 operates on the virtual machine 25 as a standby system (SBY), to execute scale down (Hotdel) (S24).

Upon reception of the scale-down instruction, the scale-down execution unit 215 (e.g., the hypervisor (HV)) of the server 21 executes Hotdel (Hotdel) (S25), removes virtual CPUs (vCPUs) allocated to the virtual machine 25, on which the application 27 of a standby system (SBY) runs, releases process assignment, and transmits a scale-down (Hotdel) completion notification to the virtualization control apparatus 20 (S26).

Upon reception of the scale-down (Hotdel) completion notification, the sequence control unit 201 of the virtualization control apparatus 20 starts the system switching control unit 204, which then transmits a system switching instruction to the application 17 on the virtual machine 15 on the server 11 (S27).

The system switching of the applications is performed between the servers 11 and 21 (S28). The system switching unit 112 of the server 11 in which the application 17 operates on the virtual machine 15 as an active system (ACT), switches the application 17 to a new standby system (SBY), and instructs the server 21 in which the application 27 operates on the virtual machine 25 as a standby system (SBY), to switch to an active system (ACT), for example. As a result, the system switching unit 212 of the server 21 sets the application 27 to an active system (ACT) (switches the application 27 from a standby system to an active system).

The server 11 in which the application 17 on the virtual machine (VM) 15 switches to a standby system (SBY) as a result of the system switching, notifies the virtualization control apparatus 20 of completion of the system switching (S29).

The sequence control unit 201 of the virtualization control apparatus 20, upon reception of a notification of completion of the system switching, transmits a scale-down completion notification to EMS 10 (S30).

<System Switching: Scale-Up>

Figure 9:
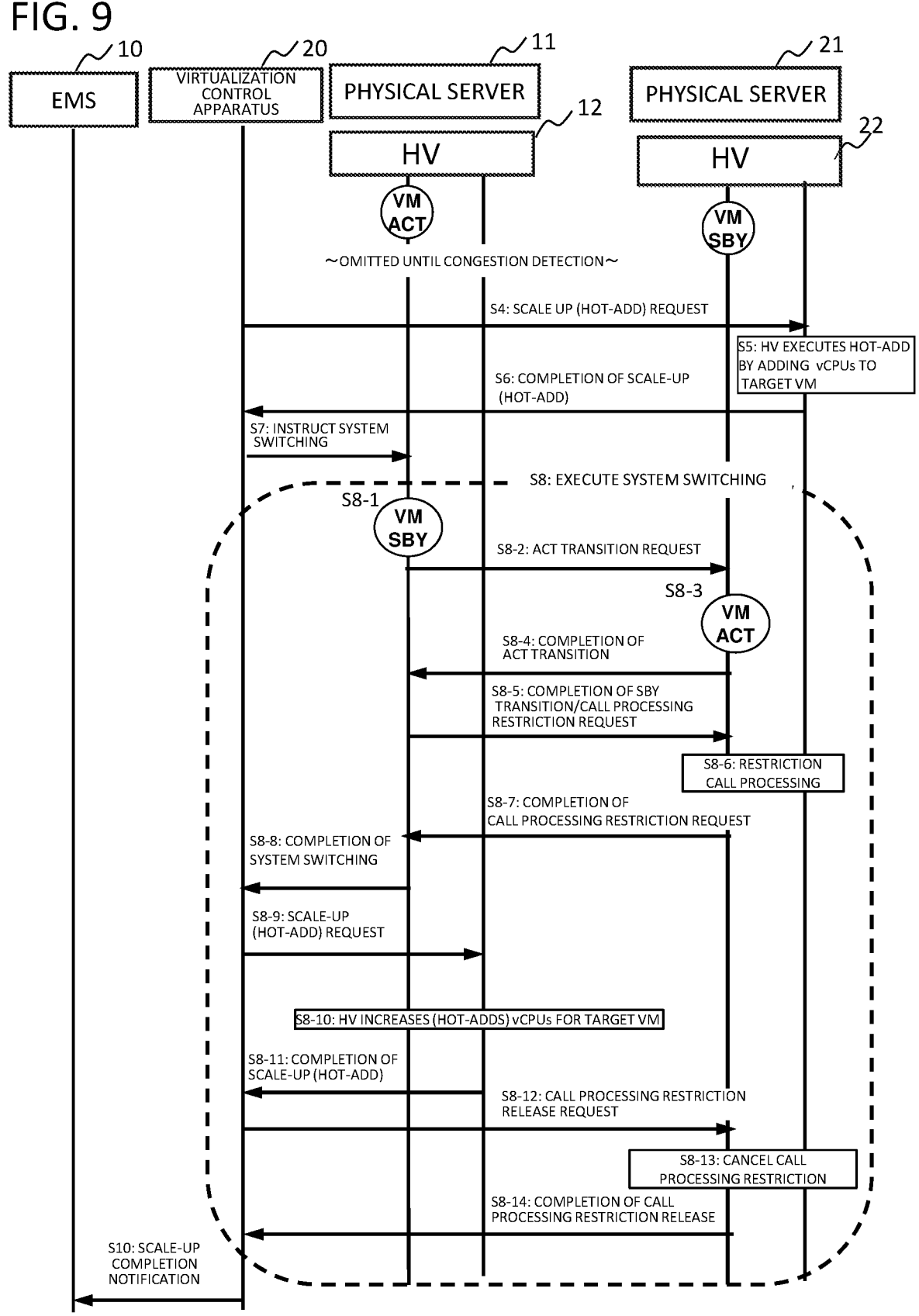
FIG. 9 is a diagram illustrating an example of system switching (when scale up is performed) in an example embodiment of the present invention.

FIG. 9 is a diagram illustrating in detail an example of the system switching sequence (S8) in FIG. 7.

In FIG. 9, sequences (step numbers) from S1 to S7 are the same as in FIG. 7. Although the virtualization control apparatus 20 transmits a request to a physical server 21 of a standby system (SBY) to execute scale up (Hotadd), upon reception of a notification of congestion detection in the virtual machine on the physical server 11 in FIG. 7, triggered by a request from a maintenance operator (e.g., EMS 10), the virtualization control apparatus 20 may transmit a request to the physical server 21 of a standby system (SBY) to execute scale up (Hotadd).

Upon reception of the system switching instruction from the virtualization control apparatus 20, the system switching unit 112 of the server 11 with the application 17 operating thereon as an active (ACT) system, switches the application 17 to a standby system (SBY) (S8-1). It is noted that the virtualization control apparatus 20 communicates with the hypervisors (HVs) of the servers 11 and 21.

The server 11 in which the application 17 on the virtual machine (VM) 15 is newly switched to a standby system (SBY), transmits a request (ACT transition request) to transition to an active system, to the application 27 on the virtual machine (VM) 25 on the server 21 (ACT) (S8-2). In the system switching of the application 17 from an active system (ACT) to a standby system (SBY), the server 11 may set flag information indicating whether the application 17 is currently of an active system (ACT) or a standby system (SBY) to "standby (SBY)" though not limited thereto. The server 11 may save, in a predetermined storage area, information necessary for the application 27 that becomes a newly active system (ACT), to take over information, such as an execution environment, setting parameter information, data, etc., of the application 17 that has been hitherto of an active system (ACT), and forward the information to the server 21 in which the application 27 is switched to a newly active system (ACT).

In the server 21, upon reception of the ACT transition request from the application 17 of the server 11, the system switching unit 212 sets the application 27 to an active system (ACT) (S8-3).

The application 27 of the server 21 that has become a newly active system (ACT) transmits an ACT transition completion notification to the server 11 (S8-4).

Upon reception of the ACT transition completion notification from the server 21, the application 17 on the virtual machine 15 on the server 11 transmits a notification that the application 17 on the server has transitioned to a standby system (SBY) (SBY transition completion) and a call processing restriction request to the server 21 (S8-5).

Upon reception of the call processing restriction request from the server 11, the processing restriction control unit 213 of the server 21 may restrict call processing performed by the virtual machine (S8-6). This restricts an amount of call processing, during system switching, so that any additional call processing is not accepted, until scaled up of both the standby (SBY) and active (ACT) systems are completed.

The processing restriction control unit 213 of the server 21, upon completion of setting of the call processing restriction, notifies completion of the call processing restriction request to the server 11 (S8-7).

In the server 11 (in which the application 17 is switched to a new standby system), upon reception of the completion of call processing restriction request, the system switching unit 112 notifies the virtualization control apparatus 20 of completion of the system switching (S8-8).

The virtualization control apparatus 20 transmits a scale-up (Hotadd) request to the server 11 (hypervisor (HV)) in which the application 17 operates on the virtual machine 15 as a standby system (SBY) (S8-9). In a hot standby redundant system, data replication is performed between an active system (ACT) and a standby system. Therefore, if scale up is executed in the server 21 alone (server with the application operating on the virtual machine and switched to a new active system), there is performance difference, such that scale up (Hotadd) is also executed in the server 11 (hypervisor (HV)) in which the application 17 has just become a standby system (SBY), in order for processing not to be affected by performance difference between apparatuses before scale-up and after scale up.

The scale-up execution unit 114 of the server 11 increases (Hotadd) virtual CPUs allocated to the virtual machine (VM) 15 on which the application 17 runs (S8-10). At this time, virtual memory, virtual storage, bandwidth of a virtual network, the number of installed virtual NICs, etc., allocated to the virtual machine may, as a matter of course, be increased.

The scale-up execution unit 114 of the server 11 transmits a scale-up (Hotadd) completion notification to the virtualization control apparatus 20 (S8-11).

The virtualization control apparatus 20 transmits a request to release the call processing restriction to the server 21 (S8-12). The processing restriction control unit 213 of the server 21 releases the call processing restriction (S8-13). Since the new active system (ACT) and the new standby system (SBY) have completed scale up, the new active system is allowed to accept a further amount of call processing corresponding to perform scale up (increase). The processing restriction control unit 213 of the server 21 transmits a notification of completion of call processing restriction release to the virtualization control apparatus 20 (S8-14).

The virtualization control apparatus 20, upon reception of the notification of completion of call processing restriction release, transmits a scale-up completion notification to EMS 10 (S20).

In the example of FIG. 9, the virtualization control apparatus 20 transmits the call processing restriction release request to (the application, that runs on the virtual machine and becomes a new active system, of) the server 21 (S8-12), however, the server 11 that has completed scale-up (Hotadd) may transmit the call processing restriction release request to the server 21. In this case, the server 21 that has released the call processing restriction, transmits a call processing restriction release completion notification to the server 11, the server 11, upon reception of the call processing restriction release completion notification, transmits a system switching completion notification to the virtualization control apparatus 20, in accordance with to S9 in FIG. 7. The virtualization control apparatus 20, upon reception of the system switching completion notification, transmits a scale-up completion notification to EMS 10. In FIG. 9, as the processing restriction of the virtual machine (the application running thereon) on the server of a new active system, restriction imposed on call processing (e.g., VoIP (Voice over IP)) and release thereof are described, but processing selected as a target for restriction in the virtual machine (application running thereon) on the server of a new active system (ACT) may, as a matter of course, be any one other than the call processing.

<System Switching: Scale-Down>

Figure 10:
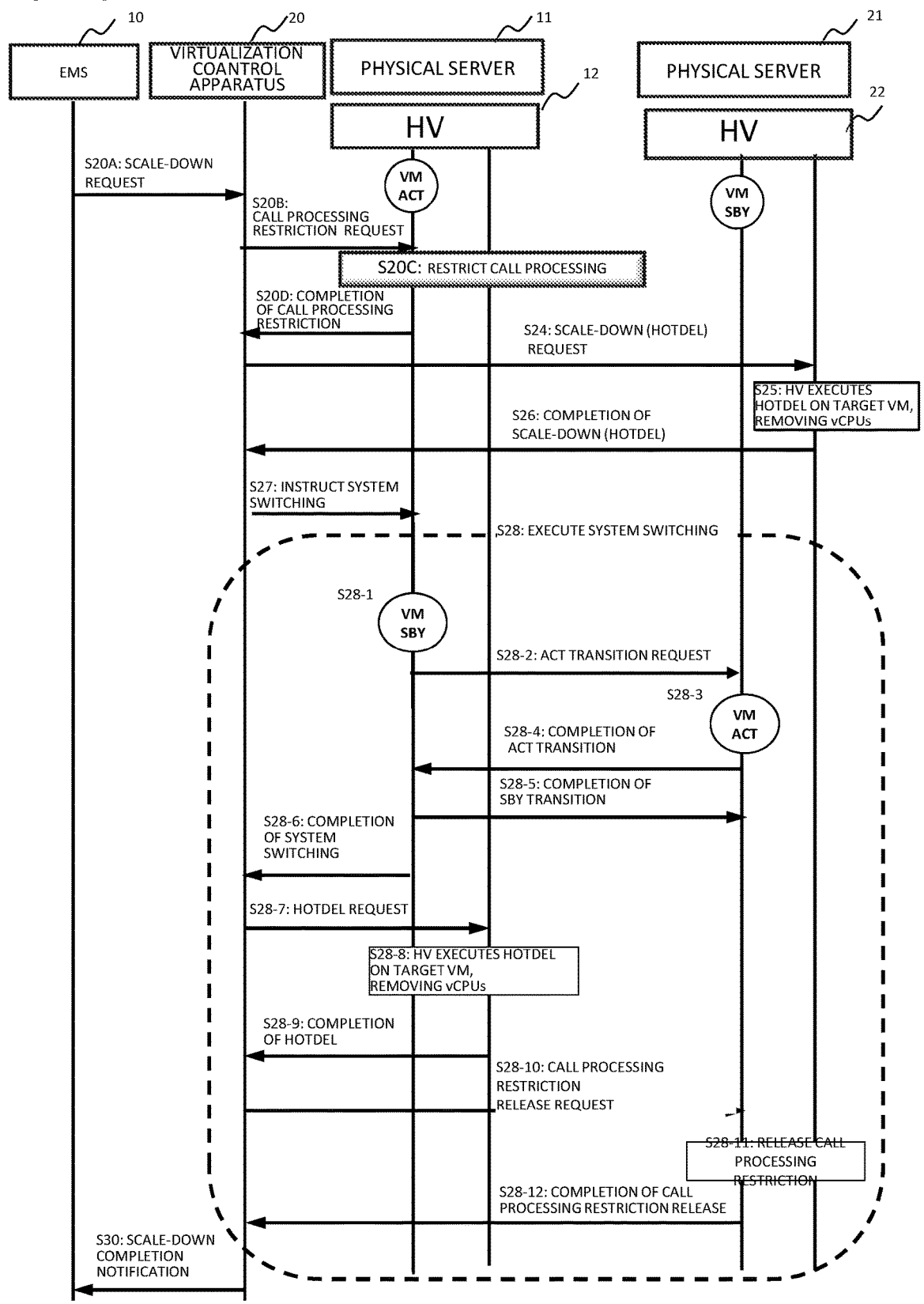
FIG. 10 is a diagram illustrating an example of system switching (when scale down is performed) in an example embodiment of the present invention.

FIG. 10 is a diagram illustrating in detail an example of the system switching sequence (S28) in FIG. 8. Note that steps S24 to S27 and S30 in FIG. 10 correspond to S24 to S27 and S30 in FIG. 8, respectively.

In FIG. 8, after detecting a processing margin, the server 11 transmits a judgment that scale-down is possible to the virtualization control apparatus 20, which in turn instructs the server 21 to perform scale down while, in the example of FIG. 10, EMS 10 in FIG. 7 instructs and requests the virtualization control apparatus 20 to execute scale down (S20A).

The virtualization control apparatus 20, upon reception of the scale-down request, transmits a call processing restriction release request to the server 11 in which the application 17 operates on the virtual machine (VM) 15 as an active system (ACT) (S20B). The processing restriction control unit 113 of the server 11 restricts call processing performed by the virtual machine (VM) (S20C). Call processing restriction (reduction) is performed in advance so that call processing after the scale-down will not suffer from congestion responsive to an amount that is before the scale-down.

The server 11 transmits a call processing restriction completion notification to the virtualization control apparatus 20 (S20D).

Triggered by the scale-down request from EMS 10, the virtualization control apparatus 20 requests the server 21 (hypervisor (HV)) in which the application 27 operates on the virtual machine (VM) as a standby system (SBY), to execute scale down (Hotdel) (S24). The scale-down execution unit 215 of the server 21 removes virtual CPUs (vCPUs) allocated to the virtual machine (VM), on which the application of a standby system (SBY) runs (S25). At this time, virtual memory, virtual storage, bandwidth of a virtual network, the number of installed virtual NICs, etc., allocated to the virtual machine may be decreased. When removing relevant virtual CPUs (vCPUs), the scale-down execution unit 215 of the server 21 in which the application operates on the virtual machine (VM) as a standby system (SBY), releases process assignment to the relevant virtual CPUs (vCPUs) and then removes the relevant virtual CPUs (vCPUs).

The server 21 transmits a scale-down completion notification (Hotdel completion notification) to the virtualization control apparatus 20 (S26).

The virtualization control apparatus 20 instructs the server 11 to execute system switching (S27).

Upon reception of the system switching instruction from the virtualization control apparatus 20, the system switching unit 112 of the server 11 sets the application 17 operating on the virtual machine (VM) 15 on the server 11 to a standby system (SBY) (S28-1).

The server 11 transmits a request (ACT transition request) to the server 21 for the application 27 operating on the virtual machine (VM) 25 to transition to the active system (ACT) (S28-2).

The system switching unit 212 of the server 21 sets the application 27 operating on the virtual machine (VM) 25 on the server 21 to an active system (ACT) (S28-3). The application 27 of the server 21 that has newly become an active system (ACT) takes over operating environment, setting information, etc., of the application 17 on the server 11, which was of an active system (ACT) before the system switching. In this example, the call processing restriction requested by the virtualization control apparatus 20 and imposed on the application 17 on the virtual machine 15, which was of an active system (ACT) before the system switching, is taken over by the application 27 on the virtual machine, which has newly become active (ACT).

The server 21 having the newly active system (ACT) application 27 operating on the virtual machine (VM) 25 transmits an ACT transition completion notification to the server 11 (S28-4).

Upon reception of the ACT transition completion notification, the server 11 notifies the server 21 that the application 17 on the virtual machine 15 on the server 11 of completion of transition to the standby system (S28-5).

The server 11 notifies the virtualization control apparatus 20 of completion of the system switching (S28-6).

The virtualization control apparatus 20 transmits a scale-down (Hotdel) request to the server 11 in which the application 17 operates on the virtual machine 15 as a standby system (SBY) (S28-7). In a hot standby redundant system, data replication is performed between the active system (ACT) and standby systems, for example. Therefore, if scale down is executed in the virtual machine in one of the server alone (server in which the application on the virtual machine has become a new active system), there is performance difference, such that scale down (Hotdel) is also executed in the virtual machine of the other one of the servers in which the application has just become a standby system (SBY), in order for processing not to be affected by performance difference between apparatuses before scale-up and after scale up.

The scale-down execution unit 115 (e.g., implemented on the hypervisor (HV)) of the server 11 decreases (Hotdel) virtual CPUs allocated to the virtual machine 15 with the application 17 operating thereon as a standby system (SBY) (S28-8). At this time, the scale-down execution unit 115 of the server 11 decreases (Hotdel) virtual CPUs, after releasing process assignment to these virtual CPUs.

The server 11 transmits a scale-down (Hotdel) completion notification to the virtualization control apparatus 20 (S28-9).

The virtualization control apparatus 20 transmits a call processing restriction release request to the server 21 (S28-10). The processing restriction control unit 213 of the server 21 releases the call processing restriction (S28-11). With completion of scale down of the applications operating on the virtual machines (VMs) (a new active system (ACT) and a new standby system (SBY)), the call processing restriction imposed by the processing restriction control unit 213 is released in the new active system. The server 21 transmits a notification of completion of the call processing restriction release to the virtualization control apparatus 20 (S28-12).

The virtualization control apparatus 20, upon reception of notification of completion of the call processing restriction release, transmits a scale-down completion notification to the EMS 10 (S30). In the example of FIG. 10, the virtualization control apparatus 20 transmits a call processing restriction release request to the server 21 (S28-10), but, the server 21 may transmit the call processing restriction release request to the server 11, which may then transmit a system switching completion notification to the virtualization control apparatus 20 in accordance with the sequence number 29 in FIG. 8, and the virtualization control apparatus 20, upon reception of the system switching completion notification, may transmit a scale-down completion notification to EMS 10.

In FIG. 10, as an example of the processing restriction of the applications operating on the virtual machines on the servers of an active system before the system switching and of a new active system, restriction imposed on call processing (e.g., VoIP (Voice over IP)) and release thereof are described, but processing selected as a target for restriction in the application operating on the virtual machine on the server of a new active system may, as a matter of course, be any one other than the call processing.

Figure 12:
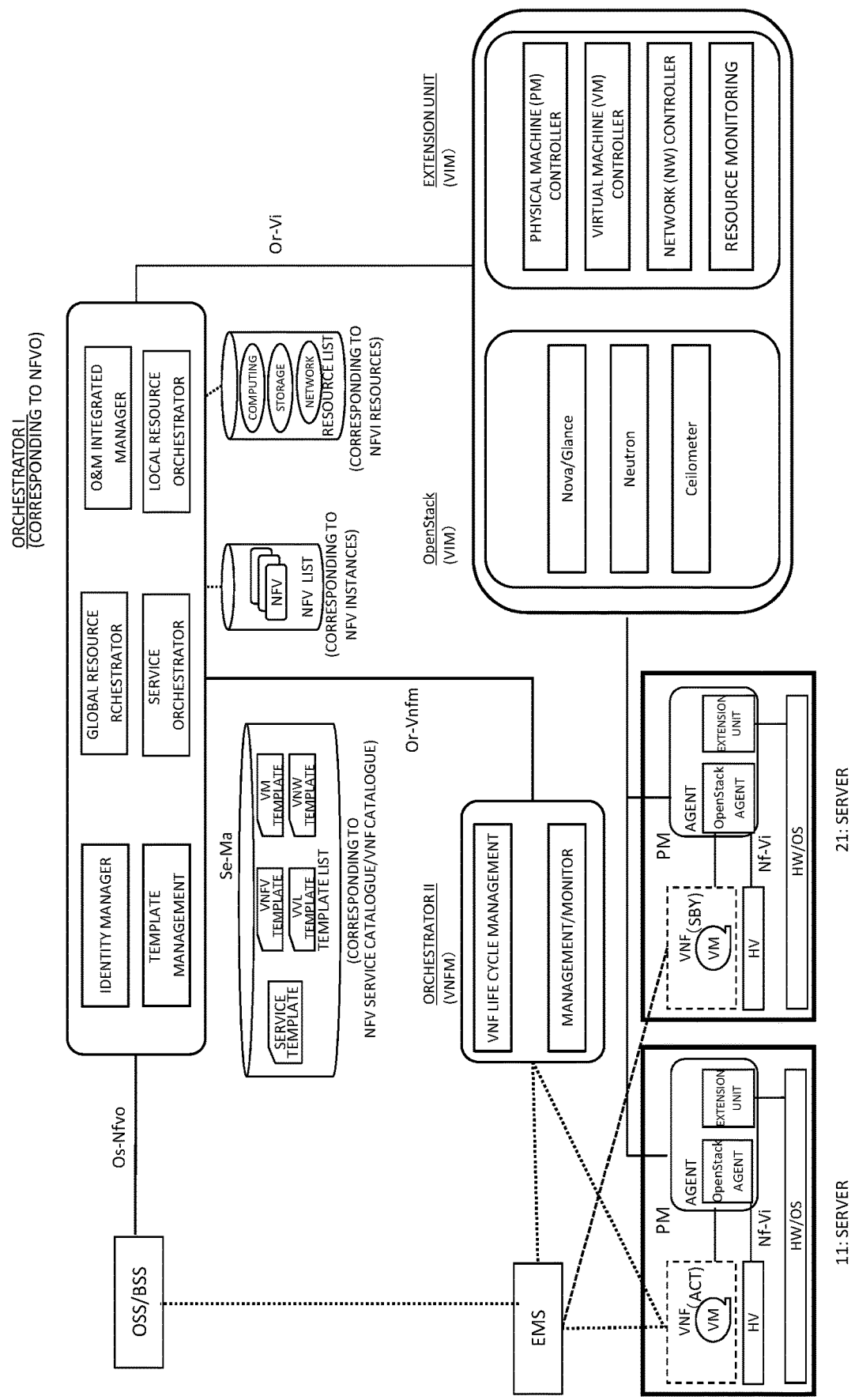
FIG. 12 is a diagram illustrating an example in which the present invention is applied to an NFV system.

FIG. 12 is a diagram illustrating an example in which scale controlling using a redundant system according to the above described present example embodiment is applied to an NFV system. In an example of FIG. 12, OpenStack and an extension unit constitute VIM in FIG. 11. An orchestrator II that performs VNF life cycle management, configuration information management, and state monitoring constitutes VNFM in FIG. 11. An orchestrator I in FIG. 12 includes an identity manager, a global resource orchestrator, a local resource orchestrator, an Operations and Maintenance (O&M) integrated manager, template management, and a service orchestrator. The details of the orchestrator I (corresponding to NVFO) will be omitted. Regarding configuration and functions of NVFO, in addition to the related description of FIG. 11, reference may be made as appropriate to Non-Patent Literature 1 for details.

OpenStack includes:

Nova (VM network resource control, etc.)/Glance (image management of guest OS, etc.);

Neutron (control and configuration management of virtual network used by VM); and Ceilometer (measurement and monitoring of resource usage amount of NFVI).

For example, Nova/Glance controls start/termination of VM, VM migration, management of VM resource information, etc. Neutron controls creation of a virtual network and attachment of the virtual network. Ceilometer controls collection of VM resource usage status, management of notification policy (notification from NFVO), notification to NFVO, etc.

Though not limited thereto, the extension unit includes, for example:

A physical machine (PM) controller that performs control of physical machine(s) (PM(s)) and resource management;

A virtual machine (VM) controller that performs control of deployment of virtual machine(s) (VM(s)) (PM selection, etc.);

A network controller that performs management control such as monitoring failure of a virtual network used by a virtual machine, resource management, etc.; and Resource monitoring that performs monitoring of NFVI resources on a server (e.g., collecting failure information and resource usage status of physical machine(s) (PM(s)) and virtual machine(s) (VM(s)), notification policy management (instructions from NFVO), and notification to NFVO) and so forth.

Servers 11 and 21 in FIG. 12 correspond to the servers 11 and 21 in FIG. 5. The servers 11 and 21 may each include agents of OpenStack and the extension unit. In the servers 11 and 21, HV denotes hypervisor, VM denotes virtual machine, and HW/OS denotes hardware resources and OS. VNFs (Virtual Network Functions) on the servers 11 and 21 correspond to the applications on the virtual machines in FIG. 5. VNF may be VDU (Virtualization Deployment Unit).

The functions (scale-up/scale-down control, system switching control, etc.) of the virtualization control apparatus 20 in FIG. 5 can be implemented on the controllers in OpenStack and the extension unit corresponding to VIM, or on the orchestrator corresponding to the VNFM in FIG. 12, for example. FIG. 12 illustrates a configuration in which the servers are duplicated, corresponding to that in FIG. 5. However, such a configuration in which at least one application (VNF, VDU) out of a plurality of applications (VNFs, VDUs) running on a plurality of virtual machines on a server is an active system and at least another application (VNF, VDU) is of a standby system may be employed. Alternatively, a configuration in which one or more VMs are of an active system and another one or more VMs are of a standby system may be used.

Each disclosure of the above-listed Non Patent Literature is incorporated herein by reference. Modification and adjustment of each example embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

The invention claimed is:

1. A node system comprising:
   a first computer that executes processing when operating as an active system of a redundant system;
   a second computer that is able to perform at least one of scale-up and scale-down when operating as a standby system of the redundant system; and
   a controller that issues an instruction to the second computer operating as the standby system to perform the scale-up or the scale-down, when the active system needs to be scaled-up or scaled-down,
   wherein the second computer operating as the standby system, responsive to the instruction, in case of performing the scale-up, increases the number of virtual CPUs (Central Processing Units) included in the second computer and allocates one or more processes to one or more virtual CPUs added, while in case of performing the scale-down, the second computer decreases the number of virtual CPUs included in the second computer and releases allocation of one or more processes allocated to one or more virtual CPUs deleted, and transmits a completion notification to the controller when the scale-up or the scale-down is completed, and
   wherein, upon reception of the completion notification of the scale-up or the scale-down from the second computer of the standby system, the controller controls to execute system switching of the redundant system to switch the second computer operating as the standby system undergoing the scale-up or scale-down to a new active system and to switch the first computer operating as the active system to a new standby system.

2. The node system according to claim 1, wherein the controller controls the first computer of the new standby system to perform scale-up or scale-down in the same way as the second computer of the standby system before switching to the new active system.

3. The node system according to claim 1, wherein the controller determines whether the active system needs to be scaled up or scaled down, based on processing load in the active system.

4. The node system according to claim 1, wherein the first and second computers are constituted by first and second server apparatuses, or,
   the first and second computers are included in a same server apparatus.

5. The node system according to claim 4, wherein the server apparatus comprises:
   a virtual network function (VNF) implemented by software and operating on a virtual machine; and
   an NFVI (Network Functions Virtualization Infrastructure) that provides an execution infrastructure for the VNF, and
   wherein the NFVI includes at least one of virtualized computing, storage, and network resources obtained by virtualizing, with a virtualization layer, at least one of hardware computing, storage, and network resources.

6. A node system comprising:
   a first computer that executes processing when operating as an active system of a redundant system;
   a second computer that is able to perform at least scale-up, when operating as a standby system of the redundant system; and a controller that issues an instruction to the second computer operating as the standby system to perform scale-up when the active system needs to be scaled-up, wherein the second computer operating as the standby system, responsive to the instruction, in performing the scale-up, increases the number of virtual CPUs (Central Processing Units) included in the second computer and allocates one or more processes to one or more virtual CPUs added, and transmits a scale-up completion notification to the controller when the scale-up is completed, wherein, upon reception of the scale-up completion notification from the second computer of the standby system that completes the scale-up, the controller controls to execute system switching of the redundant system to switch the second computer operating as the standby system undergoing the scale-up to a new active system, and to switch the first computer operating as the active system before the system switching to a new standby system, wherein after the system switching, the first computer of the new standby system imposes a processing restriction on the second computer of the new active system, wherein the controller instructs the first computer of the new standby system to perform scale-up in the same way as the second computer of the standby system that transitions to the new active system, and wherein the controller, upon reception of a scale-up completion notification from the first computer of the new standby system, releases the processing restriction imposed on the first computer of the new active system.

7. A node system comprising:

a first computer that executes processing when operating as an active system of a redundant system;

a second computer that is able to perform at least scale-down, when operating as a standby system of the redundant system; and a controller that imposes a processing restriction on the first computer of the active system and then issue an instruction to the standby system to perform scale-down, when the active system needs to be scaled down, wherein the second computer operating as the standby system, responsive to the instruction, in performing the scale-down, decreases the number of virtual CPUs included in the second computer and releases allocation of one or more processes allocated to one or more virtual CPUs deleted, and transmits a scale-down completion notification to the controller when the scale-down is completed, wherein the controller, upon reception of the scale-down completion notification from the second computer of the standby system, controls to execute the system switching of the redundant system to switch the second computer operating as the standby system undergoing the scale-down to a new active system and to switch the first computer operating as the active system to a new standby system, wherein the controller, after the system switching, instructs the first computer of the new standby system to perform scale-down in the same way as the second computer of the standby system becoming the new active system, and wherein the controller releases the processing restriction imposed on the second computer of the new active system, upon reception of a scale-down completion notification from the first computer of the new standby system.

8. A server apparatus comprising:

a processor; and a memory storing program instructions executable by the processor, wherein the processor is configured to execute:

a redundant system constituted by an active system and a standby system, wherein the active system executes processing and the standby system is able to perform at least one of scale-up and scale-down; and a control process that issues an instruction to the standby system to perform the scale-up or the scale-down, when the active system needs to be scaled-up or scaled-down, wherein the standby system, responsive to the instruction, in case of performing the scale-up, increases the number of virtual CPUs (Central Processing Units) included in the standby system and allocates one or more processes to one or more virtual CPUs added, while in case of performing the scale-down, the standby system decreases the number of virtual CPUs included in the standby system and releases allocation of one or more processes allocated to one or more virtual CPUs deleted, and transmits a completion notification to the control process when the scale-up or the scale-down is completed, and wherein the control process, upon reception of the completion notification from the standby system, controls to execute system switching of the redundant system to switch the standby system undergoing the scale-up or scale-down to a new active system and to switch the active system to a new standby system.

9. A server apparatus comprising:

a processor; and a memory storing program instructions executable by the processor, wherein the processor is configured to execute:

a redundant system constituted by an active system and a standby system, wherein the active system executes processing and the standby system is able to perform at least scale-up out of scale-up and scale-down; and a control process that issues an instruction to the standby system to perform the scale-up when the active system needs to be scaled-up, wherein the standby system, responsive to the instruction, in performing the scale-up, increases the number of virtual CPUs (Central Processing Units) included in the standby system and allocates one or more processes to one or more virtual CPUs added, and transmits a scale-up completion notification to the control process when the scale-up is completed, wherein, upon reception of the scale-up completion notification from the standby system that completes the scale-up, the control process controls to execute system switching of the redundant system to switch the standby system undergoing the scale-up to a new active system, and to switch the active system before the system switching to a new standby system, wherein after the system switching, the new standby system imposes a processing restriction on the new active system, wherein the control process instructs the new standby system to perform scale-up in the same way as the standby system that transitions to the new active system, and wherein the control process, upon reception of a scale-up completion notification from the new standby system, releases the processing restriction imposed on the new active system.

10. A server apparatus comprising:
a processor; and
a memory storing program instructions executable by the processor,
wherein the processor is configured to execute:
a redundant system constituted by an active system and a standby system, wherein the active system executes processing and the standby system is able to perform at least scale-down of scale-up and the scale-down; and
a control process that imposes a processing restriction on the active system and then issue an instruction to the standby system to perform scale-down, when the active system needs to be scaled down,
wherein the standby system, responsive to the instruction, in performing the scale-down, decreases the number of virtual CPUs included in the standby system and releases allocation of one or more processes allocated to one or more virtual CPUs deleted, and transmits a scale-down completion notification to the control process when the scale-down is completed,
wherein, upon reception of the scale-down completion notification from the standby system, the control process controls to execute the system switching of the redundant system to switch the standby system undergoing scale-up or scale-down to a new active system and to switch the active system to a new standby system,
wherein the control process, after the system switching, instructs the new standby system to perform scale-down in the same way as the standby system becoming the new active system, and
wherein the control process releases the processing restriction imposed on the new active system, upon reception of a scale-down completion notification from the new standby system.

11. A scaling control method of an active system of a redundant system executing processing and a standby system of the redundant system being able to perform at least one of scale-up and scale-down, the scaling control method comprising:
issuing, by a control apparatus, an instruction to the standby system to perform scale-up or scale-down, when the active system needs to be scaled-up or scaled-down;
increasing, by the standby system, responsive to the instruction and in case of performing the scale-up, the number of virtual CPUs (Central Processing Units) included in the standby system and allocating one or more processes to one or more virtual CPUs added;
decreasing, by the standby system, responsive to the instruction and in case of performing the scale-down, the number of virtual CPUs included in the standby system and releasing allocation of one or more processes allocated to one or more virtual CPUs deleted;
transmitting a completion notification to the control apparatus, when the scale-up or scale-down is completed; and
upon reception of the completion notification from the standby system, controlling, by the control apparatus, to execute system switching to switch the standby system undergoing the scale-up or scale-down to a new active system and to switch the active system before the system switching to a new standby system.

12. The scaling control method according to claim 11, comprising:
performing scale-up or scale-down of the new standby system in the same way as the standby system that transitions to the new active system.

13. The scaling control method according to claim 11, comprising:
determining whether scale-up or scale-down is necessary, depending on processing load in the active system; and
performing scale-up or scale-down for the standby system and the active system, when it is determined that scale-up or scale-down is necessary.

14. The scaling control method according to claim 11, wherein the active system and the standby system are constituted by different server apparatuses, or
the active system and the standby system are implemented on a same server apparatus.

15. The scaling control method according to claim 14, wherein
the server apparatus comprises:
a virtual network function (VNF) implemented by software operating on a virtual machine; and
an NFVI (Network Functions Virtualization Infrastructure) that provides an execution infrastructure for the VNF,
wherein the NFVI includes at least one of virtualized computing, storage, and network resources obtained by virtualizing, with a virtualization layer, at least one of hardware computing, storage, and network resources.

16. A scaling control method of an active system of a redundant system executing processing and a standby system of the redundant system being able to perform at least scale-up out of the scale-up and scale-down, the scaling control method comprising:
instructing, by a control apparatus, the standby system to perform scale-up, when the active system needs to be scaled up;
by the standby system, responsive to the instruction and in case of performing the scale-up, increasing the number of virtual CPUs (Central Processing Units), allocating one or more processes to one or more virtual CPUs added, and transmitting a scale-up completion notification to the control apparatus when the scale-up is completed;
upon reception of the scale-up completion notification from the standby system that completes the scale-up, controlling, by the control apparatus, to execute system switching to switch the standby system undergoing the scale-up to a new active system, and to switch the active system before the system switching to a new standby system;
imposing, by the new standby system, a processing restriction on the new active system, after the system switching;
instructing, by the control apparatus, the new standby system to perform scale-up in the same way as the standby system that transitions to the new active system; and
releasing, by the control apparatus, the processing restriction imposed on the new active system, upon completion of the scale-up of the new standby system.

17. A scaling control method of an active system of a redundant system executing processing and a standby system of the redundant system being able to perform at least scale-down, the scaling control method; comprising:

when the active system needs to be scaled down, imposing, by the control apparatus, a processing restriction on the active system;

instructing, by the control apparatus, the standby system to perform scale-down;

the standby system, in performing the scale-down, decreasing the number of virtual CPUs (Central Processing Units), releasing allocation of one or more processes allocated to one or more virtual CPUs deleted, and transmitting a scale-down completion notification to the control apparatus when the scale-down is completed;

upon reception of the scale-down completion notification from the standby system, controlling, by the control apparatus, to execute system switching of the redundant system to switch the standby system undergoing the scale-down to a new active system and to switch the active system to a new standby system;

instructing, by the control apparatus, the new standby system to perform scale-down in the same way as the standby system that transitions to the new active system; and releasing, by the control apparatus, the processing restriction on the new active system upon completion of the scale-down of the new active system.

18. A non-transitory computer-readable recording medium storing therein a program causing a computer to execute a control process of a redundant system constituted by an active system and a standby system, wherein the active system executes processing and the standby system is able to perform at least one of scale-up and scale-down, the control process comprising:

issuing an instruction to the standby system to perform scale-up or scale-down when the scale-up or the scale-down of the active system is needed, the standby system, responsive to the instruction, in case of performing the scale-up, increasing the number of virtual CPUs (Central Processing Units) included in the standby system and allocating one or more processes to one or more virtual CPUs added, the standby system, responsive to the instructions, in case of performing the scale-down, decreasing the number of virtual CPUs included in the standby system and releasing allocation of one or more processes allocated to one or more virtual CPUs deleted, and transmitting a completion notification to the control apparatus when the scale-up or scale-down is completed; and controlling, upon reception of the completion notification from the standby system, to execute system switching of the redundant system to switch the standby system undergoing the scale-up or scale-down to a new active system and to switch the active system before the system switching to a new standby system.

19. The non-transitory computer-readable recording medium according to claim 18, storing there in a program causing the computer to execute processing comprising:

performing scale-up or scale-down of the new standby system in the same way as the standby system that becomes the new active system after system switching.

20. A non-transitory computer-readable recording medium storing therein a program causing a computer to execute a control process of a redundant system constituted by an active system that executes processing and a standby system that is able to perform at least scale-up out of scale-up and scale-down, the control process comprising:

instructing, by the control process, the standby system to perform scale-up, when the active system needs to be scaled up;

the standby system, in performing the scale-up, increasing the number of virtual CPUs (Central Processing Units), allocating one or more processes to one or more virtual CPUs added, and transmitting a scale-up completion notification to the control apparatus when the scale-up is completed;

upon reception of the scale-up completion notification from the standby system undergoing the scale-up, controlling, by the control process, to execute system switching of the redundant system to switch the standby system that completes the scale-up to a new active system and to switch the active system before the system switching to a new standby system;

imposing, by the new standby system, a processing restriction on the new active system;

instructing, by the control process, the new standby system to perform scale-up in the same way as the standby system that becomes the new active system; and releasing, by the control process, the processing restriction imposed on the new active system, upon reception of a scale-up completion notification from the new standby system.

21. A non-transitory computer-readable recording medium storing therein a program causing the computer to execute a control process of scaling down an active system of a redundant system constituted by the active system that executes processing and a standby system that is able to perform at least scale-down out of scale-up and scale-down:

imposing, by the control process, a processing restriction on the active system before the system switching;

instructing, by the control process, the standby system before the system switching to perform scale-down;

the standby system, in performing the scale-down, decreasing the number of virtual CPUs (Central Processing Units), releasing allocation of one or more processes allocated to one or more virtual CPUs deleted, and transmitting a scale-down completion notification to the control apparatus when the scale-down is completed;

upon reception of the scale-down completion notification from the standby system that completes the scale-down, controlling, by the control process, to execute system switching of the redundant system to switch the standby system undergoing the scale-down to a new active system and to switch the active system before the system switching to a new standby system;

instructing, by the control process, the new standby system to perform scale-down as the standby system that becomes the new active system; and releasing, by the control process, the processing restriction imposed on the new active system, upon completion of the scale-down of the new standby system.

* * * * *

UNITED STATES PATENT AND TRADEMARK OFFICE
CERTIFICATE OF CORRECTION

PATENT NO. : 10,628,273 B2
APPLICATION NO. : 15/544416
DATED : April 21, 2020
INVENTOR(S) : Yuki Yoshimura et al.

Page 1 of 1

It is certified that error appears in the above-identified patent and that said Letters Patent is hereby corrected as shown below:

In the Specification

Column 17, Preferred Modes, Line 31; After "server", insert --11--

Signed and Sealed this
Fourteenth Day of July, 2020

Andrei Iancu
*Director of the United States Patent and Trademark Office*